(12) United States Patent
Norp

(10) Patent No.: US 10,735,925 B2
(45) Date of Patent: Aug. 4, 2020

(54) MESSAGE DISTRIBUTION SYSTEM AND METHOD FOR PROVIDING LOCAL TRAFFIC MESSAGES

(71) Applicants: Koninklijke KPN N.V., The Hague (NL); Nederlandse Organisatie voor Toegepast—Natuurwetenschappelijk Onderzoek TNO, s-Gravenhage (NL)

(72) Inventor: Antonius Hendrikus Johannes Norp, The Hague (NL)

(73) Assignees: Koninklijke KPN N.V., Rotterdam (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 42 days.

(21) Appl. No.: 15/745,905

(22) PCT Filed: Jul. 21, 2016

(86) PCT No.: PCT/EP2016/067366
§ 371 (c)(1),
(2) Date: Jan. 18, 2018

(87) PCT Pub. No.: WO2017/013194
PCT Pub. Date: Jan. 26, 2017

(65) Prior Publication Data
US 2018/0212867 A1    Jul. 26, 2018

(30) Foreign Application Priority Data
Jul. 23, 2015   (EP) .................................... 15178020

(51) Int. Cl.
*H04W 4/44*     (2018.01)
*H04W 4/02*     (2018.01)
(Continued)

(52) U.S. Cl.
CPC ............. *H04W 4/44* (2018.02); *H04L 45/304* (2013.01); *H04W 4/023* (2013.01);
(Continued)

(58) Field of Classification Search
None
See application file for complete search history.

(56) References Cited

U.S. PATENT DOCUMENTS

2002/0102961 A1* 8/2002 Gibbons .............. G08G 1/0965
455/404.2
2005/0093717 A1* 5/2005 Lilja .................... G08G 1/0965
340/902
(Continued)

FOREIGN PATENT DOCUMENTS

WO     2014/048486 A1    4/2014

OTHER PUBLICATIONS

PCT International Search Report and Written Opinion, PCT International Application No. PCT/EP2016/067366, dated Oct. 10, 2016, 10 pages.
(Continued)

*Primary Examiner* — Otis L Thompson, Jr.
(74) *Attorney, Agent, or Firm* — McDonnell Boehnen Hulbert & Berghoff LLP

(57) ABSTRACT

The disclosure relates to a message distribution system configured to provide traffic messages received by at least one base station of a telecommunications network to at least one traffic control system capable of controlling traffic infrastructure. The message distribution system comprises a detection module and a routing module. The detection module is configured to detect traffic messages from user devices in a radio coverage area of the at least one base station. The routing module is configured to access association information associating at least one routing address of
(Continued)

the at least one traffic control system with the radio coverage area of the at least one base station and to route the detected traffic messages to the at least one routing address associated with the radio coverage area of the at least one base station receiving the traffic messages from the user devices.

22 Claims, 18 Drawing Sheets

(51) Int. Cl.
    *H04L 12/725*     (2013.01)
    *H04W 72/00*     (2009.01)
    *H04W 4/40*     (2018.01)
    *H04L 29/08*     (2006.01)
    *H04W 88/08*     (2009.01)

(52) U.S. Cl.
    CPC ......... *H04W 72/005* (2013.01); *H04L 69/324* (2013.01); *H04W 4/02* (2013.01); *H04W 4/40* (2018.02); *H04W 88/08* (2013.01)

(56) References Cited

U.S. PATENT DOCUMENTS

| | | | |
|---|---|---|---|
| 2007/0112503 A1* | 5/2007 | Johnson | G08G 1/0104 701/117 |
| 2007/0153696 A1* | 7/2007 | Choyi | H04L 63/0218 370/235 |
| 2012/0270558 A1 | 10/2012 | Busch et al. | |
| 2014/0309815 A1* | 10/2014 | Ricci | H04W 4/21 701/2 |
| 2016/0155327 A1* | 6/2016 | Schlienz | H04W 4/046 340/907 |
| 2017/0280485 A1* | 9/2017 | Yu | H04W 8/005 |

OTHER PUBLICATIONS

"Intelligent Transport Systems (ITS); Vehicular Communications GeoNetworking; Part 3: Network Architecture", draft ETSI EN 302 636-3 V1.1.4, Sep. 4, 2014, pp. 1-23.

European Search Report, European Patent Application No. 15178020.2 dated Jan. 26, 2015, 7 pages.

* cited by examiner

MESSAGE DISTRIBUTION SYSTEM AND METHOD FOR PROVIDING LOCAL TRAFFIC MESSAGES

CROSS REFERENCE TO RELATED APPLICATIONS

The present application is a national stage entry of, and claims priority to, PCT/EP2016/067366, filed on Jul. 21, 2016, which claims priority to European Patent Application EP 15178020.2, filed in the European Patent Office on Jul. 23, 2015, both of which are hereby incorporated in their entirety herein by reference.

FIELD OF THE INVENTION

The invention relates to a message distribution system and a message distribution method for providing traffic messages to traffic control systems for controlling traffic infrastructure. More particularly, the invention relates to a message distribution system and method wherein at least one base station of a telecommunications infrastructure is used.

BACKGROUND

Intelligent Transport Systems (ITS) have attracted increased attention in recent years. Intelligent Transport Systems include telematics and all types of communications in vehicles, between vehicles, and between vehicles and fixed locations.

In Vehicle to Vehicle (V2V) communications, cars may distribute data messages to surrounding cars using Proximity Services (ProSe) broadcast. The same principle has also been proposed for Vehicle to Person (V2P) communications, where cars exchange messages with the mobile phones of vulnerable road users such as pedestrians and cyclists. It has also been proposed to use ProSe communications for Vehicle to Infrastructure (V2I) communications, where cars exchange messages with roadside equipment to e.g. receive information on speed limits, applicable road signs, find nearby parking spots, traffic lights, etc.

The assumption with using ProSe communications for V2I communications is that there is a Road Side Unit (RSU) that uses ProSe to communicate with the cars. An RSU may e.g. be fitted on top of a street light to broadcast the status of the street light to nearby cars.

The application of RSUs, however, yields several disadvantages. The application of RSUs is expensive. A lot of new RSUs have to be installed as the range of ProSe communication is generally small. Also all these RSUs have to be maintained. Another disadvantage is that the communication with the RSU is inefficient. Traffic messages from a car should normally not be directed directly to the nearby traffic infrastructure component (e.g. the traffic light, street sign, information panel), but to the traffic control systems that control these road side units. These controllers often control a larger area and are located more remotely from the traffic infrastructure components. For example, the controllers for a traffic light may not be reachable using ProSe broadcast by a car that stops in front of the traffic light.

One way of reaching the controllers is by means of ETSI TS 102 636-3, Intelligent Transport Systems (ITS); Vehicular Communications; GeoNetworking; Part 3: Network architecture. ITS messages are described to be routed using GeoNetworking. To that end, geographic information is added in a header of the ITS message by the source of the message in order to route the message to a destination that is relevant for that location. This geonetworking assumes a dedicated geonetworking protocol and routers that can route on the basis of this geonetworking protocol (with the header).

SUMMARY

The present disclosure presents, in one aspect, a message distribution system configured to provide traffic messages received by at least one base station of a telecommunications network to at least one traffic control system capable of controlling traffic infrastructure, e.g. one or more traffic lights, one or more traffic information panels, etc.

The message distribution system comprises at least a detection module and a routing module.

The detection module is configured to detect traffic messages from user devices in a radio coverage area of the at least one base station.

The routing module is configured to access association information associating at least one routing address of the at least one traffic control system with the radio coverage area of the at least one base station. The routing module is further configured to route the detected traffic messages to the at least one routing address associated with the radio coverage area of the at least one base station receiving the traffic messages from the user devices.

Other aspects of the disclosure pertain to a detection module and a routing module for use in the message distribution system.

Yet another aspect of the disclosure involves a method for providing traffic messages received by at least one base station of a telecommunications network to at least one traffic control system capable of controlling traffic infrastructure, e.g. one or more traffic lights or one or more information panels. One step of the method comprises detecting traffic messages from user devices in a radio coverage area of the at least one base station. Another step of the method comprises accessing association information associating at least one routing address of the at least one traffic control system with the radio coverage area of the at least one base station. Another step of the method comprises routing the detected traffic messages to the at least one routing address associated with the radio coverage area of the at least one base station receiving the traffic messages from the user devices.

The applicants have envisaged applying the already existing telecommunications infrastructure and, more particularly, the base stations thereof for receiving traffic messages from user devices. The present disclosure enables such messages to be received at the base stations and to be routed to the relevant traffic control systems in a reliable and fast manner, and without requiring the user devices to know or be informed of the address of the specific traffic control systems. Routing is based on the insight that both the base stations and the traffic control systems cover a particular geographic area. Traffic control systems cover a geographic area in the sense that they control specific traffic infrastructure that is fixed to a specific area. For example, if a traffic control system controls all traffic lights along a road, that road can be considered the geographic area covered by the traffic control system. The covered areas by base stations are the radio coverage areas of these base stations. Whenever the geographic areas of a traffic control system and a base station overlap, the traffic control system may be associated with these base stations.

It should be noted that the base station may communicate with the traffic control system in a wired or wireless manner.

The base station may use the same resources for communication with the traffic control system as the resources used for conventional telecommunications with user devices.

It should be appreciated that the base station may be configured to be compatible with (W-)CDMA radio access technology (3G), OFDM radio access technology (4G) or higher generation radio access technologies (5G and beyond) for receiving traffic messages from the user devices.

It should also be noted that the traffic message received by the base station may be processed by at least one of the base station, the detection module or the routing module before the traffic message arrives at the traffic control system. One example includes copying of the traffic message. Other examples include reformatting the traffic message, encapsulating the traffic message into other packets (tunneling), creating new packets, etc.

The traffic messages may comprise Intelligent Transport Systems (ITS) messages.

The association information provides routing addresses of relevant traffic control systems, i.e. traffic control systems that cover an area that overlaps with the radio coverage area of the receiving base station, in order to deliver the traffic messages at the relevant traffic control system(s). The routing address may include at least one of an IP address, a telephone number or another type of address.

The association information may take the form of a list of base stations and traffic control systems associated with the radio coverage areas of each of the base stations. The traffic control systems may be identified by the routing addresses. Further information may be added to the list, e.g. location information (e.g. GPS coordinates) for one or more of the traffic control systems.

It should further be appreciated that traffic infrastructure may be a road, or parameters associated with a road, such as maximum speed. Traffic infrastructure may also be a traffic light, a road sign, roadside equipment or for example a construction vehicle that is used during road work and is semi-permanently present near or on a road.

In one embodiment, the at least one traffic control system is located in the radio coverage area of the at least one base station. This embodiment enables direct wireless communication between the base station and the traffic control system.

In one embodiment, the at least one traffic control system is located outside of the radio coverage area of the at least one base station. This embodiment enables providing traffic messages to traffic control systems that are located outside of the radio coverage area, but that are capable of controlling traffic infrastructure that is located in the radio coverage area. One way of obtaining the association information for routing the traffic message is through a management system, wherein the association information is input for each of the base stations.

In one embodiment of the disclosure, the message distribution system is configured to wirelessly receive configuration messages from the at least one traffic control system via the at least one base station and for determining the association information from the configuration messages.

By wirelessly receiving the configuration message, the system may determine (a) that the traffic control system is in the radio coverage area of the base station and (b) the address, included in the configuration message, to be used by the system for transmitting the traffic messages. The address may be explicitly included in the configuration message, or may be derived from the configuration message (e.g. by taking the source address of the configuration message as the address of the traffic control system). An especially configured message may be used, which is recognized by the routing module as a configuration packet. The routing module may then obtain the information from the configuration message to configure the traffic control system in the association information (e.g. a list of locally relevant traffic control systems). The embodiment enables avoiding the use of a management system and easy addition of traffic control systems in the radio coverage area of the base station.

In one embodiment of the disclosure, the message distribution system is configured to receive update messages from the at least one traffic control system. Update messages may be used by the system to take account of new routing information to enable automatic adaption of the association information. When no update massages are received during a predetermined period (e.g. because the traffic control system is defect or removed), the association data may be removed.

Some user devices will be configured to both transmit traffic messages and non-traffic messages (e.g. traffic relating to accessing information on the internet, retrieving e-mails, etc.) In one embodiment of the disclosure, the detection module is configured to distinguish traffic messages from non-traffic messages received from the user devices. Several, non-limiting, embodiments have been envisaged, including:

detecting broadcast messages from the user devices at the at least one base station, e.g. Proximity Services broadcast messages, wherein the broadcast messages comprise the traffic messages;

detecting signaling messages from the user devices at the at least one base station, wherein the signaling messages comprise the traffic messages;

detecting the traffic messages by deep packet inspection; and detecting the traffic messages over a PDP context or EPS bearer associated with a specific APN.

Still another embodiment of the disclosure, involves a message distribution system, wherein the radio coverage area comprises a plurality of traffic control systems and wherein the routing module is configured for at least one of:

routing copies of a received traffic message to routing addresses of the plurality of traffic control systems associated with the radio coverage area of the at least one base station in response to detecting the traffic message;

selectively routing one or more copies of a received traffic messages to one or more routing addresses of one or more traffic control systems of the plurality of traffic control systems on the basis of an indication, e.g. a geographic location of the user device or an indication of a base station, in response to detecting the traffic message.

The first option involves routing the same traffic message to each of the traffic control systems associated with the radio coverage area of the base station. The second option provides a filtering means wherein a traffic message can be sent to a traffic control system associated with the radio coverage area of the base station in dependence of an indication provided with the traffic message. One example involves the case wherein the indication comprises geographical location information about the location of the user device, such that (e.g. by applying location information of the traffic control systems in the above-mentioned association information) traffic messages can be sent to one or more specific traffic control systems of the plurality of traffic control systems covered by the radio coverage area.

Yet another embodiment of the disclosure involves a message distribution system, wherein at least one of the detection module and the routing module is shared by a plurality of base stations.

Base Stations are increasingly split up in different parts of functionality (e.g. the Cloud RAN concept), with some functionality implemented somewhat more centrally. In this case the detection module and routing module may also be located more centrally. The detection module and routing module may also be shared by a number of base stations. The detection module may be associated with a base station in the sense that there is a particular detection module for each base station. The routing module may be associated with the base station in the sense that there is an overlap between the radio coverage area of the base station and the service area of the routing module. In case the routing module is shared amongst base stations in a set of base stations, the routing module may have a single list of traffic control systems for the set of base stations. Alternatively, a separate list of traffic control systems may be kept for each of the base stations. In the latter case, the base stations may include an identification of the base station in the traffic messages they sent to the routing module in order to enable the module to select the list associated with that base station.

It should be noted that a particular traffic control system may be associated with a number of different base stations. In other words, an exact one-to-one mapping between the coverage area of the base station(s) for which the list is maintained and the service area of the traffic control system is not required.

Sharing the detection module and/or the routing module amongst a plurality of base stations may be advantageous for efficiency reasons.

Another embodiment of the disclosure involves a message distribution system, wherein both the detection module and the routing module are co-located at a base station. Integrating both components with a base station provides for a simple and fast infrastructure for routing the traffic messages. Local availability of the detection module and the routing module has the advantage that traffic messages need not be routed all the way up to a central P-GW/GGSN in the core network of the telecommunications infrastructure. In some implementations, this is important for traffic messages as there is often a limit to the latency of traffic messages.

Another aspect of the disclosure pertains to a user device. The traffic messages do not contain routing information for routing the traffic messages to the at least one routing address of the at least one traffic control system In one embodiment, the user device is configured to both broadcast a traffic message, e.g. with a Proximity Services broadcast message, and to unicast the same traffic message to the at least one base station. The embodiment enables the user device to simultaneously send traffic messages (containing substantially identical information) to devices (e.g. of neighboring traffic participants) configured to receive the broadcast messages and to a base station. It should be appreciated that the information conveyed by the traffic messages may be relevant not only for traffic control systems, but also for other road users. If for example a person is driving in a car, the velocity and position of the car may be relevant for controlling a nearby traffic light (using the method disclosed herein) as well as for a nearby cyclist (carrying a user device configured to receive the broadcast message).

As will be appreciated by one skilled in the art, one or more steps of the present disclosure may be embodied as a system, a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system". Functions described in this disclosure may be implemented as an algorithm executed by a processor/microprocessor of a computer. Furthermore, aspects of the present disclosure may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Embodiments of the present invention will be further illustrated with reference to the attached drawings, which schematically will show embodiments according to the invention. It will be understood that the present invention is not in any way restricted to these specific embodiments.

It is noted that the invention relates to all possible combinations of features recited in the claims.

BRIEF DESCRIPTION OF THE DRAWINGS

Aspects of the invention will be explained in greater detail by reference to exemplary embodiments shown in the drawings, in which.

DETAILED DESCRIPTION OF THE FIGURES

Figure 1:
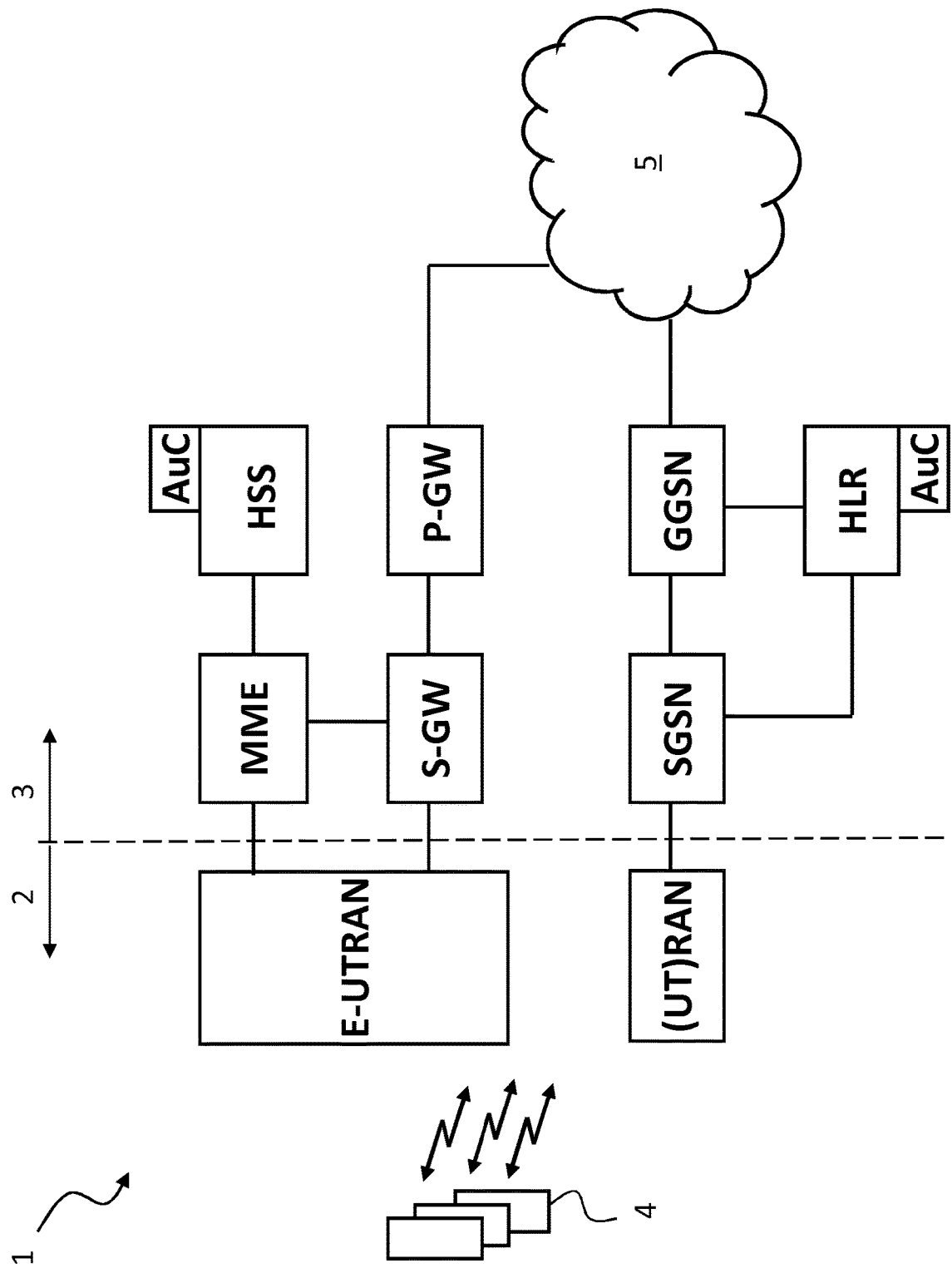
FIG. 1 is a schematic illustration of a telecommunications system comprising a radio access network system and a core network system.

FIG. 1 shows a schematic illustration of a telecommunications system 1. The telecommunications system 1 comprises a radio access network system 2 (also indicated as E-UTRAN or RAN in FIG. 1) and a control network system 3 containing various elements or nodes as described in further detail below.

In the telecommunications system of FIG. 1, three generations of networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS network.

For a GSM/GPRS network, a radio access network system 2 comprises a plurality of base stations (combination of a BSC and a BTS) and one or more Radio Network Controllers (RNCs), not shown individually in FIG. 1. The core network system 3 comprises a Gateway GPRS Support Node (GGSN), a Serving GPRS Support Node (SGSN, for GPRS) or Mobile Switching Centre (MSC, for GSM, not shown in FIG. 1), a Home Location Register (HLR) combined with an Authentication Centre (AuC).

For a UMTS radio access network (UTRAN), the radio access network system 2 also comprises a Radio Network Controller (RNC) connected to a plurality of NodeBs, also not shown. In the core network system 3, the GGSN and the SGSN/MSC are conventionally connected to the HLR/AuC.

The upper branch in FIG. 1 represents a next generation network, commonly indicated as Long Term Evolution (LTE) system or Evolved Packet System (EPS).

The radio access network system 2, indicated as E-UTRAN, comprises evolved NodeBs (eNodeBs or eNBs) providing wireless access for a device 4. The core network system 3 comprises a PDN Gateway (P-GW) and a Serving Gateway (S-GW). The EUTRAN of the EPS is connected to the S-GW via a packet network. The S-GW is connected to a Home Subscriber Server HSS and a Mobility Management Entity MME for signaling purposes.

For GPRS, UMTS and LTE systems, the core network system 3 is generally connected to a further packet network 5, e.g. the internet.

Further information of the general architecture of a EPS network can be found in 3GPP TS 23.401.

5G telecommunications networks architectures have not yet been standardized. However, it can be assumed that a 5G architecture will contain a similar radio access (with base stations) and core network system.

Of course, architectures other than defined by 3GGP, e.g. WiMAX, can also be used within the context of the present disclosure.

Figure 2:
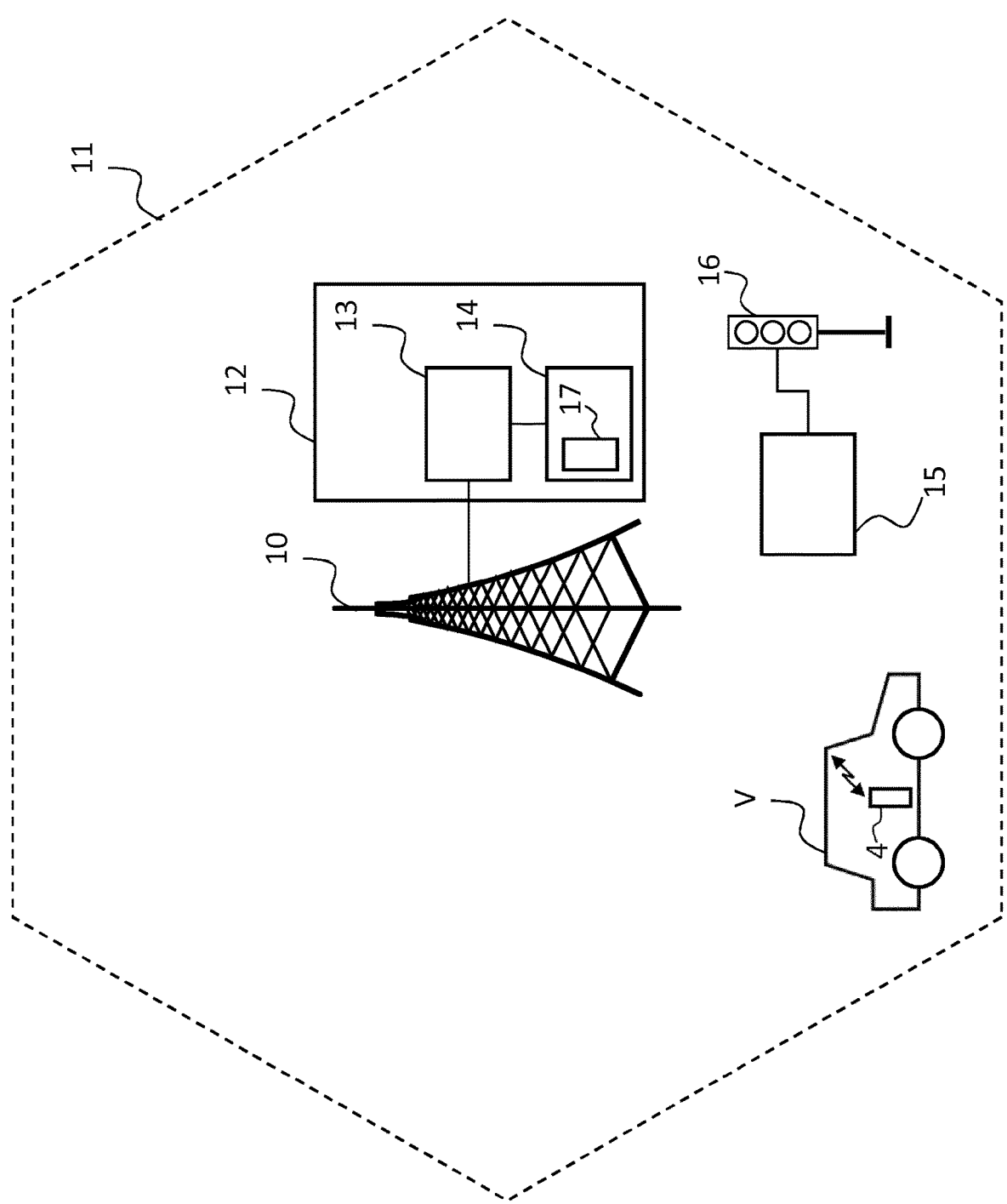
FIG. 2 is a schematic illustration of a message distribution system according to a disclosed embodiment.

FIG. 2 shows a schematic illustration of a radio access network system comprising a base station 10 of a telecommunications infrastructure as shown in FIG. 1 providing a radio coverage area 11. A vehicle V containing a user device 4 is located within the radio coverage area 11. The user device 4 may be a device integrated with the vehicle V or may be a device (e.g. a mobile phone or a tablet computer) brought in by the user when entering the vehicle V. The vehicle V may be a car, bus, truck, motorbike, bicycle or other means of road transport. The user device 4 may be a mobile phone, and is configured to transmit messages to the base station 10. The messages may comprise traffic messages and non-traffic messages, wherein the traffic messages convey information such as the speed of the vehicle V, geographic location, or even the intended route (originating, for example, from a navigation system in the car).

A message distribution system 12 comprises a detection module 13 and a routing module 14. In the embodiment shown, the message distribution system 12 is co-located with the base station 10. The message distribution system 12 is configured to provide traffic messages received by the base station 10 of a telecommunications network to at least one traffic control system 15 capable of controlling traffic infrastructure 16. Examples of traffic infrastructure include traffic lights, traffic information panels, etc.

The detection module 13 is configured to detect traffic messages, and to distinguish between traffic messages and non-traffic messages, sent by the user device 4.

The routing module 14 is configured to access association information which may be stored on a storage component 17. The association information associates a routing address of the traffic control system 15 with the radio coverage area 11 of the base station 10. The routing module 14 is configured to route detected traffic messages to the routing address associated with the radio coverage area 11 of the base station 10 receiving the traffic messages from the user device 4.

In FIG. 2, the traffic control system 15 is in the radio coverage area 11 of the base station 10, which enables direct and wireless communication between the traffic control system 15 and the base station 10. The detected traffic messages can thus be sent from the routing module 14 to the traffic control system 15 via the base station 10.

Figure 3:
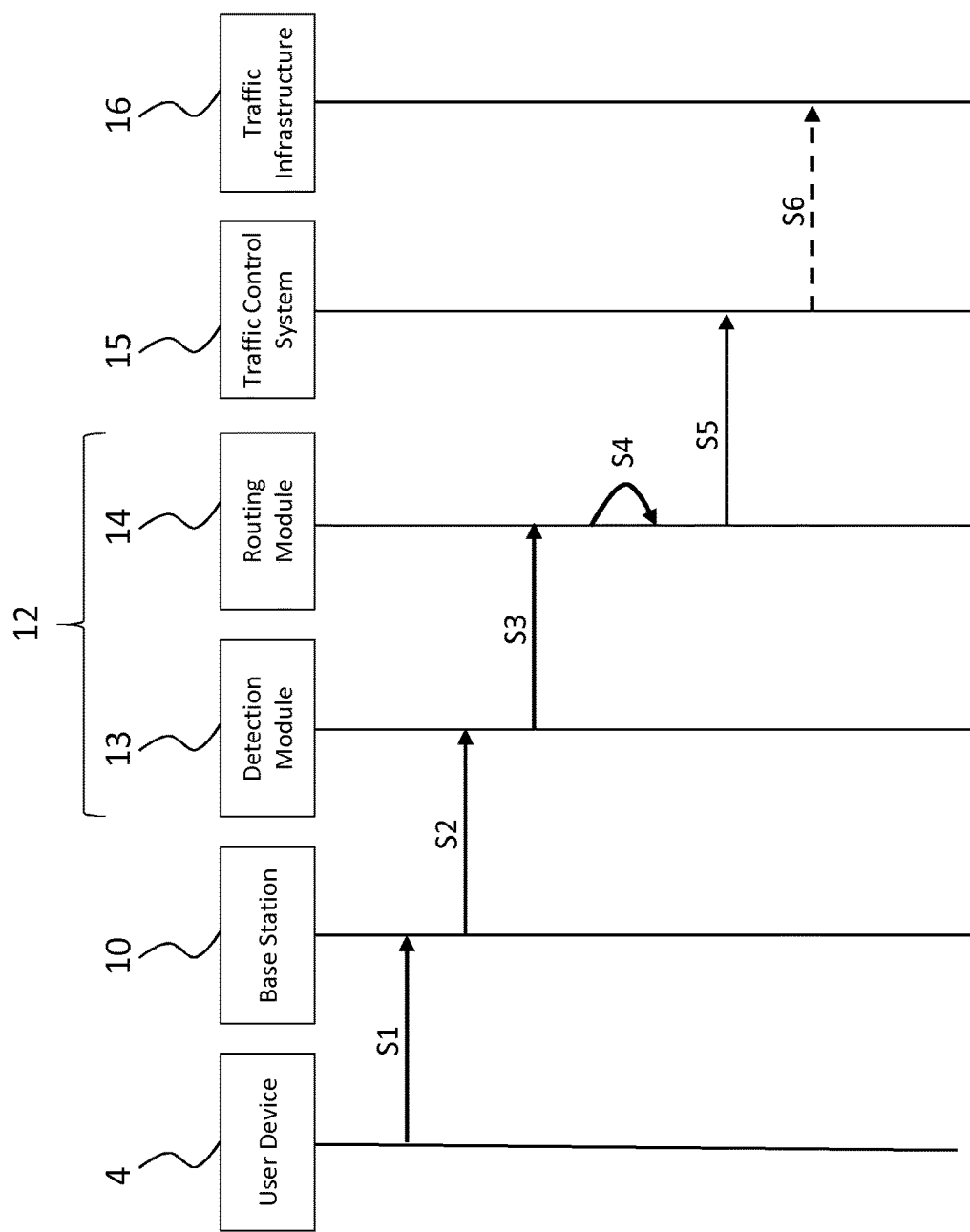
FIGS. 3 and 4 are time diagrams illustrating examples of distributing traffic messages in the message distribution system of FIG. 2.

FIG. 3 shows a time diagram for traffic message distribution in the message distribution system 12 shown in FIG. 2. Step S1 represents the transmittal of a traffic message from user device 4 to the base station 10. Base station 10 receives the traffic message and forwards the traffic message to detection module 13 in step S2. In step S2, the detection module 13 receives the message and detects (i.e. identifies) that the message is a traffic message. The detection module 13 may have programmed the address of a routing module 14 associated with the detection module 13. Step S3 represents the transmittal of the detected traffic message to the routing module 14. The routing module 14 processes the traffic message in step S4 by accessing association information in storage module 17 and retrieving a routing address of traffic control system 15 associated with the radio coverage area 11 of the base station 10 receiving the traffic messages. In step S5, the routing module 14 routes the traffic message to traffic control system 15 having the retrieved routing address. Routing may e.g. be performed using a fixed wired network (e.g. an IP network) connecting the routing module 14 with the traffic control system 15. The traffic control system 15 may now control traffic infrastructure 16, as shown in step S6. A control signal may for example be an instruction to a traffic light to turn to green, based on a vehicle V approaching the traffic light.

Figure 4:
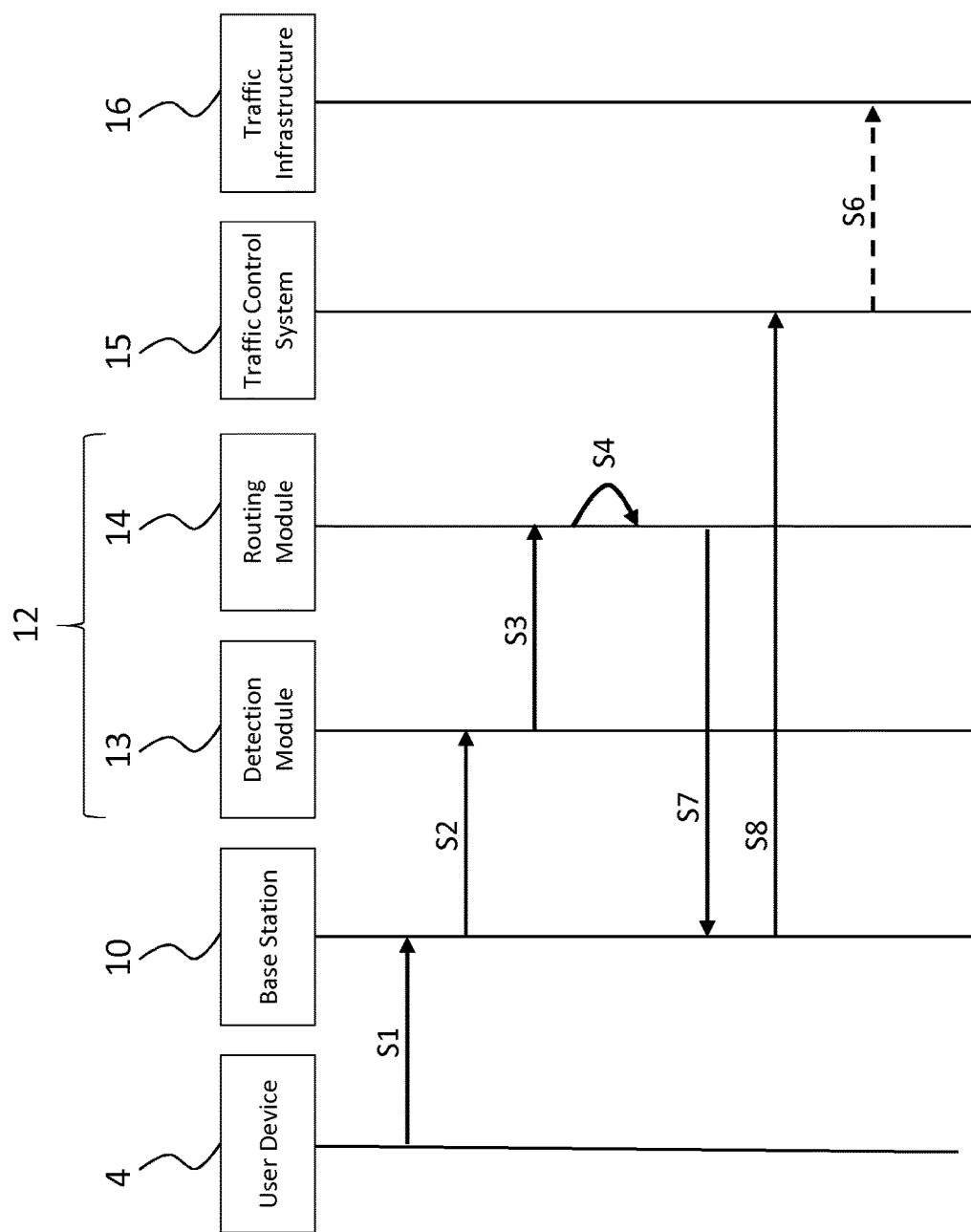

FIG. 4 shows a time diagram for traffic message distribution in the message distribution system 12 shown in FIG. 2. S1, S2, S3 and S4 have been described above with reference to FIG. 3. FIG. 4 shows that the routing module 14 routes the traffic message via base station 10 to traffic control system 15 using e.g. IP routing (the traffic control system has obtained an IP address during registration). Step S7 represents the transmittal of the traffic message from the routing module to base station 10. This step may be performed using the same network over which the traffic message was received from the base station 10 at the detection module 13 (e.g. an IP network). In step S8, the traffic control system 15 receives the traffic message from base station 10. Since the traffic control system 15 is in the radio coverage area 11 of the base station 10, the traffic message may be sent over a direct wireless connection between base station 10 and the traffic control system 15. The traffic control system 15 may now control traffic infrastructure 16, as shown in optional step S6.

Figure 5:
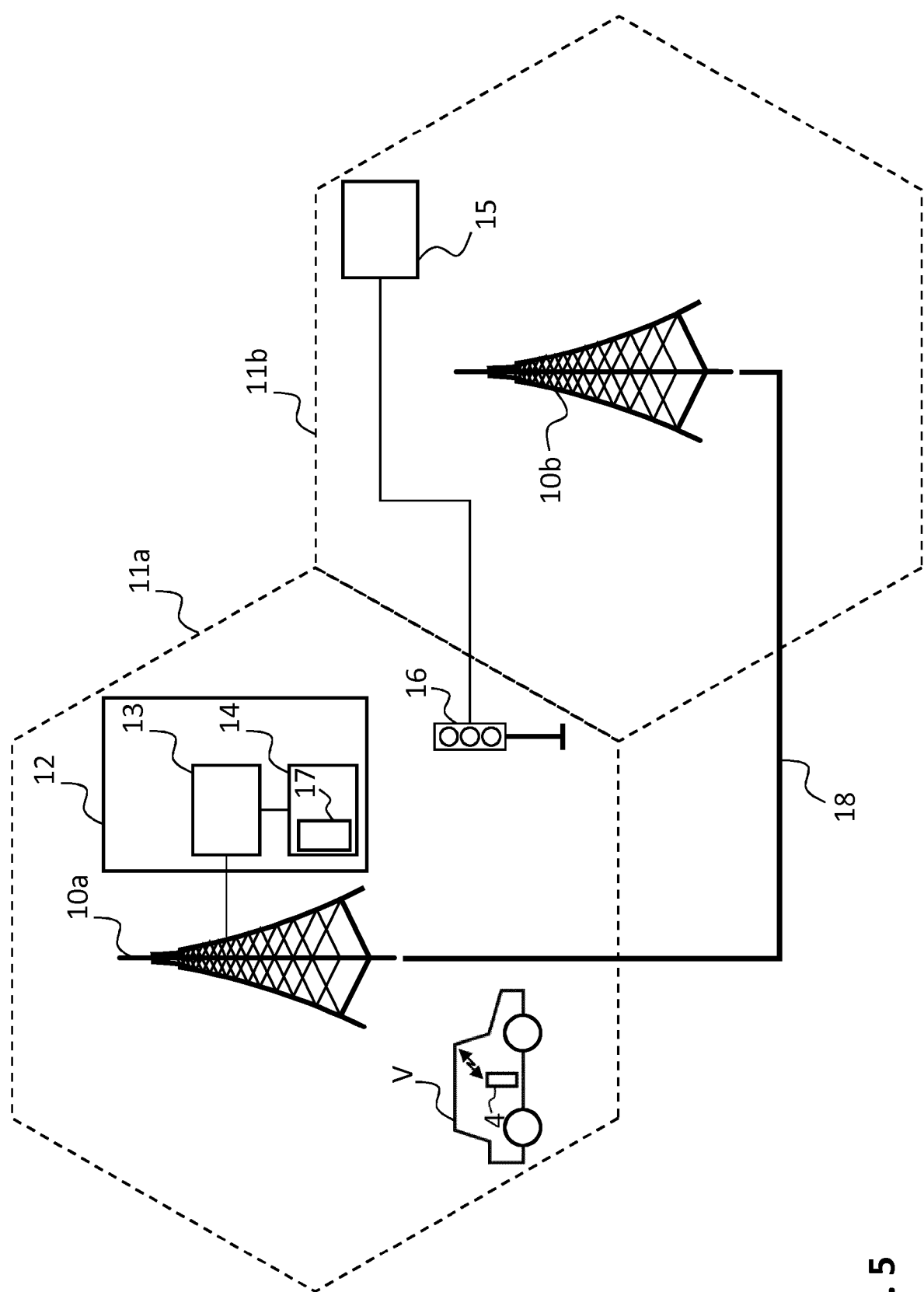
FIG. 5 is a schematic illustration of a message distribution system according to another disclosed embodiment.

FIG. 5 illustrates that the traffic control system 15 need not be in the radio coverage area 11a of the base station 10a. In FIG. 5, the traffic control system 10 is in radio coverage area 11b of base station 10b. Received traffic messages at base station 10a may be, after detection by the detection module 13, routed by routing module 14 to the traffic control system 15 via an interface 18, and via base station 10b. The interface 18 may be a connection via a local IP network used to connect base station 10a and base station 10b to the core network, and provide interconnections between them, e.g. an X2 interface.

Figure 6:
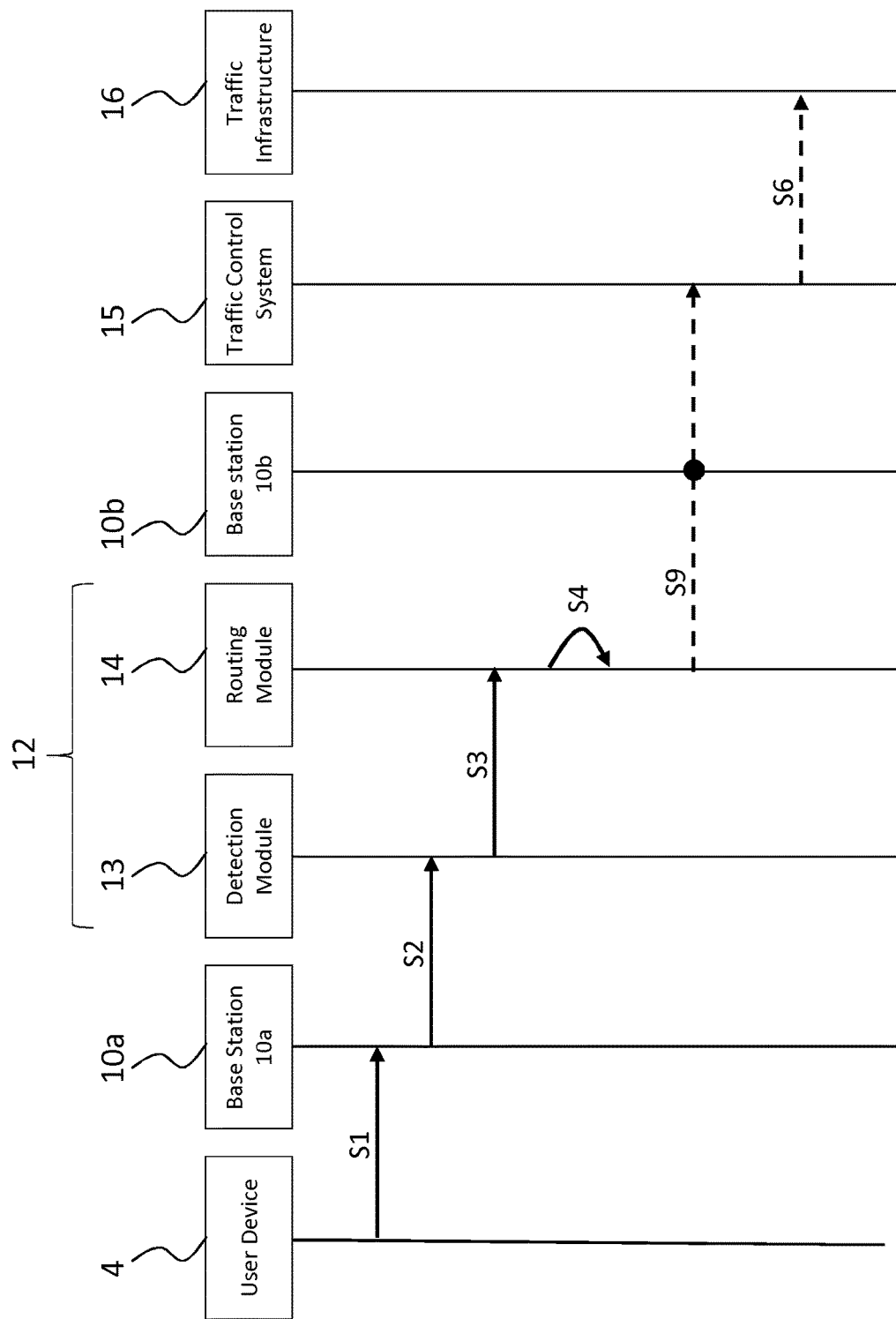
FIG. 6 is a time diagram illustrating an example of distributing traffic messages in de message distribution system of FIG. 5.

FIG. 6 shows a time diagram illustrating the traffic message distribution using the message distribution system of FIG. 5. Steps S1, S2, S3 and S4 have been described above with reference to FIG. 3. In step S9 the traffic message is transmitted to the traffic control system 15 that is in another radio coverage area 11b of base station 10b. One option for step S9 is that the traffic message is routed to the traffic control system 15 via base station 10b. It may also be that in step S9 the traffic message is sent directly from the routing module 14 to the traffic control system 15, via another connection, e.g. via an IP network (not shown in FIG. 5). The traffic control system 15 may now control traffic infrastructure 16, as shown in optional step S6.

Figure 7:
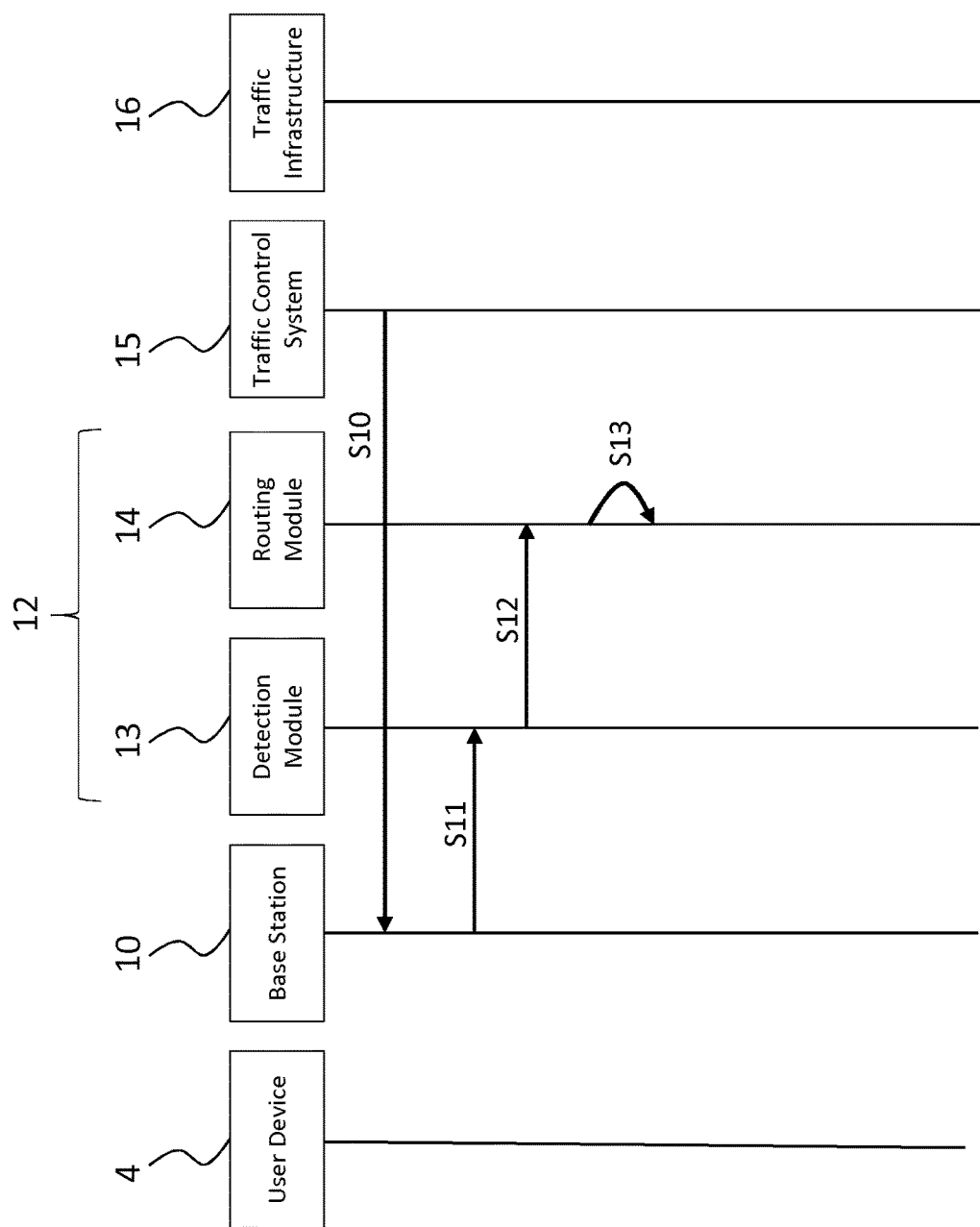
FIG. 7 illustrates a time diagram of processing a configuration message from a traffic control system in a message distribution system.

FIG. 7 shows a time diagram illustrating that the message distribution system 12 may be configured for wirelessly receiving configuration messages. In step S10 a configuration message is sent to the base station 10. The configuration message contains a routing address to be used by the message distribution system 12 for routing traffic messages to the traffic control system 15. This address may be explicitly included in the configuration message, or may be derived from the configuration message (e.g. by taking the source address of the configuration message as the address of the traffic control system). Subsequently, in step S11, the detection module 13 receives the message and detects (i.e. identifies) that the message is a traffic message (or, more specifically, a configuration message). In step S12 the message is received from the detection module 13 at the routing module 14. The configuration message is especially configured, so that it is recognized by the routing module as a configuration packet. Step S13 represents the determination of the association information from the configuration messages. After this determination, the association information comprises that the routing address of traffic control system 15 is associated with the radio coverage area 11 of base station 10.

Figure 8:
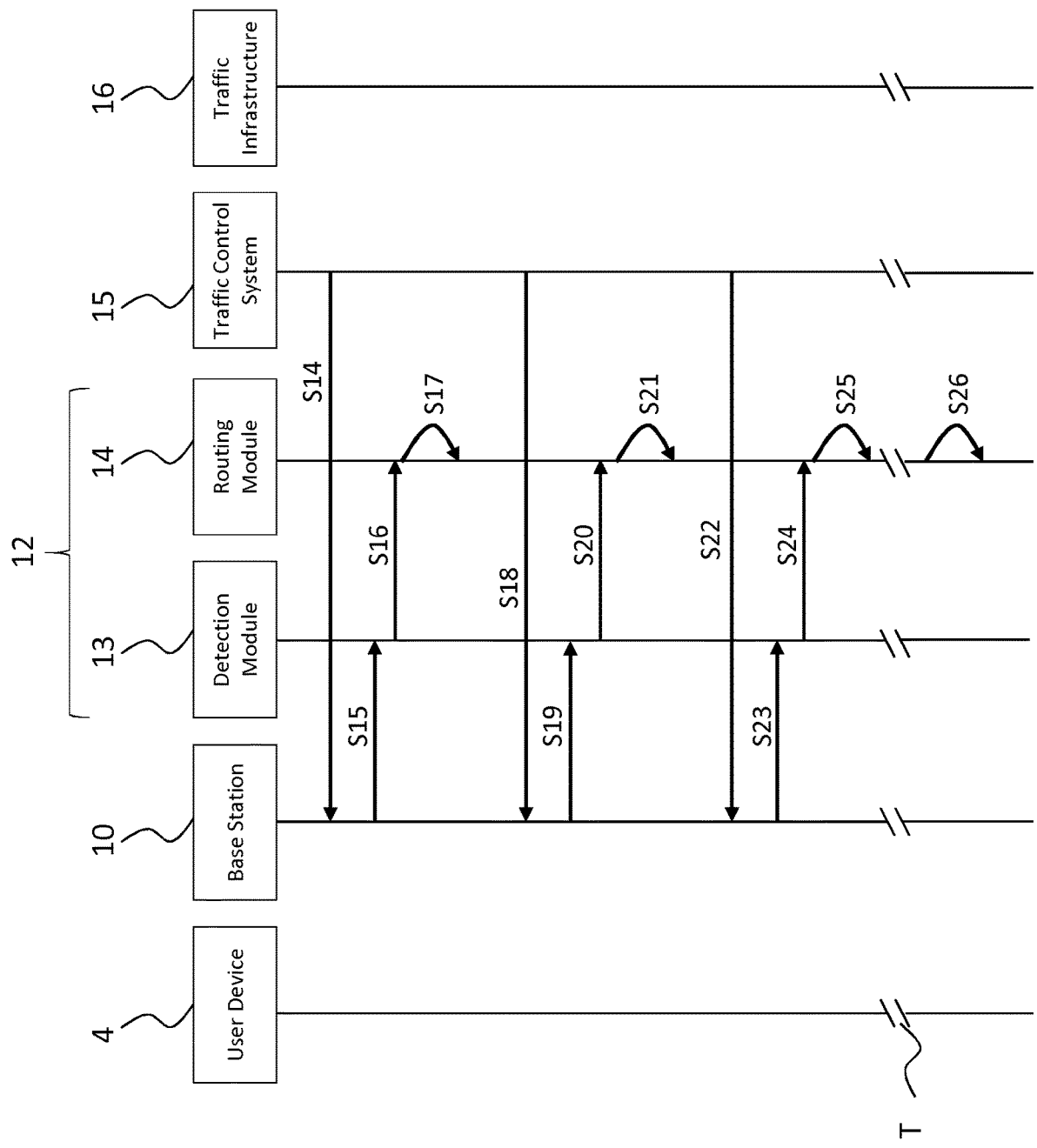
FIG. 8 illustrates a time diagram of processing update messages from a traffic control system in a message distribution system.

FIG. 8 depicts a time diagram for an embodiment wherein the message distribution system is configured to receive update messages from the traffic control system 15. FIG. 8 shows a first update cycle, steps S14-S17, a second update cycle, steps S18-S21, a third update cycle, steps S22-S25, and a cancellation step S26. In step S14 an update message is transmitted from the traffic control system 15 and received at the base station 10. Next, in step S15, the update message is received at the detection module 13 and the detection module 13 detects that the message is a traffic message (or, more specifically, an update message). Subsequently, in step S16, the update message is transmitted to the routing module 14. The update message may comprise a confirmation for the routing module 14 that the traffic control system 15 is operational, or it may confirm that the traffic control system is in the radio coverage area 11 of base station 10. The update message may also validate the routing address of the traffic control system 15. Step S17 represents the registration of this confirmation and/or validation. The second update cycle, steps S18-S21, and the third update cycle, S22-S25, are similar to the first update cycle. The message distribution system 12 may be configured to cancel the registration of the traffic control system 15 from the association information stored in storage module 17, if the message distribution system 12 has not received an update message from the traffic control system 15 during a particular time period T. The cancellation from the association information means that the routing address of the traffic control system 15 is no longer associated with the radio coverage area 10 of the base station 11, which means no traffic messages are routed anymore to the traffic control system 15. In FIG. 8 the cancellation of the traffic control system from the association information is represented by step S26.

Figure 9:
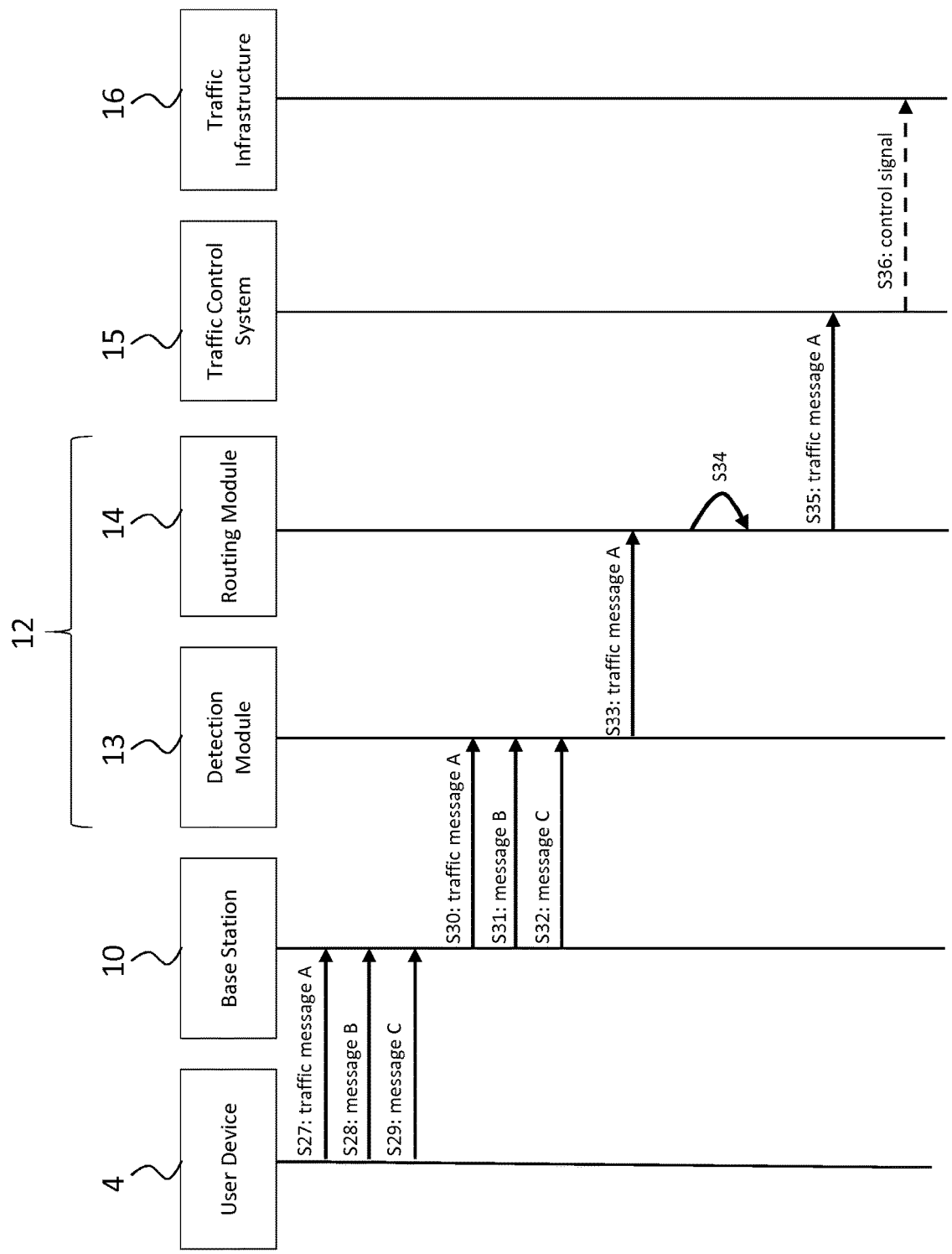
FIG. 9 is a time diagram illustrating operation of a detection module of a message distribution system.

FIG. 9 is a time diagram representing the traffic message distribution in an embodiment, wherein the detection module 13 is configured to distinguish traffic message from non-traffic messages. In step S27 a traffic message A is transmitted from a user device 4 to base station 10. Shortly thereafter the user device 4 transmits two non-traffic messages, B and C (e.g. e-mails), in steps S28 and S29 respectively. The three messages are received at the base station 10 and are subsequently received at the detection module 13 in steps S30-S32. As said, the detection module 13 is configured to distinguish between traffic and non-traffic messages and distinguishes traffic message A from non-traffic messages B and C.

It may be that the detection module 13 is configured to distinguish between traffic messages and non-traffic messages based on whether a received message at the base station 10 was a broadcast message or not. An example of this in connection with FIG. 9 would be that traffic message A was received as a ProSe broadcast message at base station 10, whereas message B and C were for example received as unicast messages, wherein the detection module 13 is configured to transmit only broadcast messages to routing module 14. It may also be that the detection module 13 is configured to distinguish between traffic messages and non-traffic messages based on whether a received message at the base station 10 was a special signaling message. An example of this in connection with FIG. 9 is that traffic message A would be a signaling message of a first type, whereas message B and C would be of another type. It may also be that the detection module 13 distinguishes between traffic and non-traffic messages based on deep packet inspection of messages received at base station 10. Deep packet inspection may reveal traffic messages, e.g. because they are given a particular indicator in the destination IP address field, protocol identifier, or port number. It may be that the deep packet inspection analyses IP packets that are encapsulated in further IP packets because of tunneling within the mobile network (e.g. GTP tunnels). It may also be that the detection module 13 is configured to distinguish between traffic messages and non-traffic messages based on a specific APN Associates with a PDP context or EPS bearer used to transport the traffic messages.

After detection of traffic message A, in step S33, only the traffic message A is transmitted to the routing module 14, after which the routing module 14 processes traffic message A by accessing association information in storage module 17 and retrieving a routing address of traffic control system 15, represented by step S34. In step S35, the traffic message A is transmitted to the traffic control system 15. The traffic control system 15 may now control traffic infrastructure 16, as shown in step S36.

Figure 10:
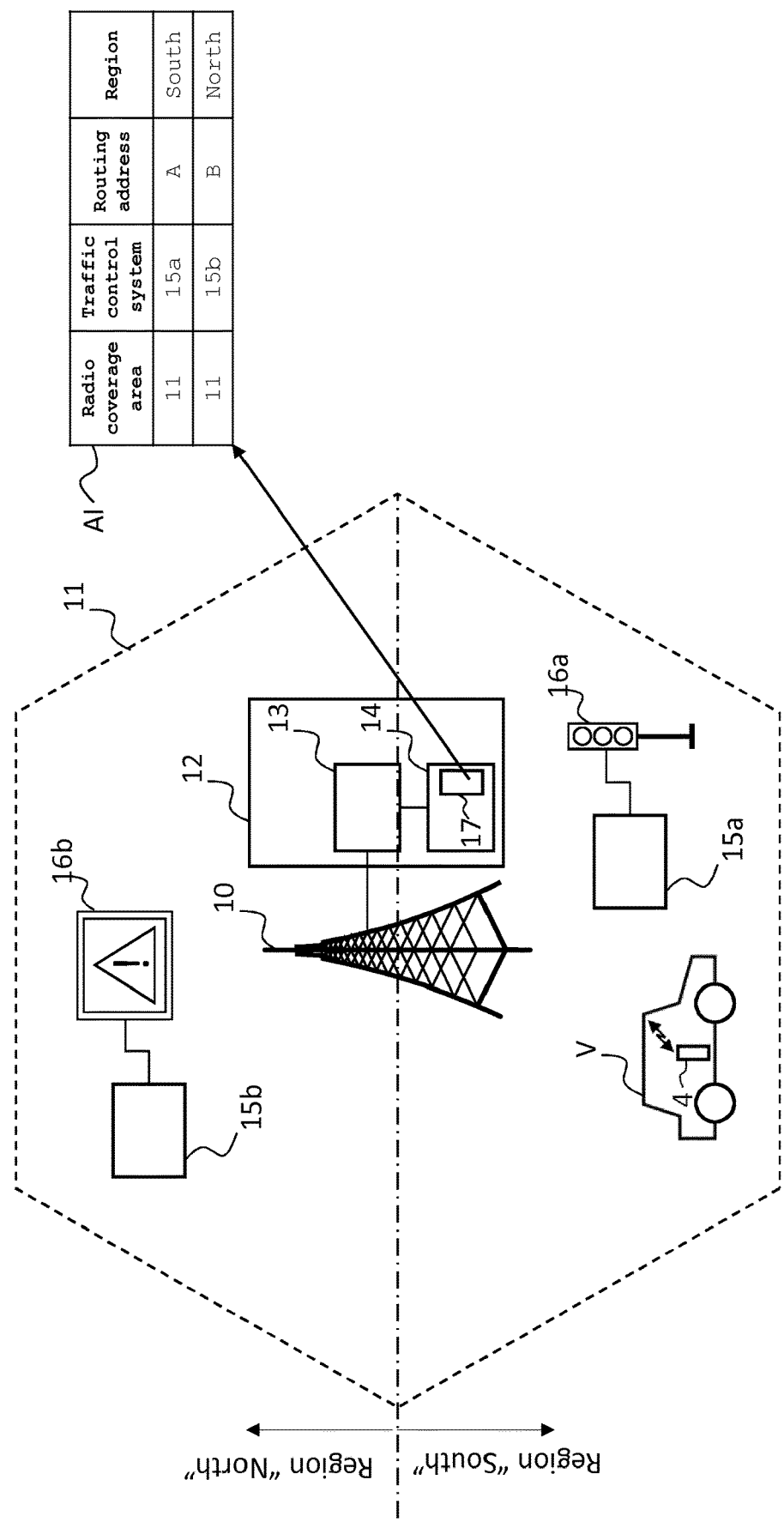
FIG. 10 is a schematic illustration of a message distribution system in an embodiment wherein a plurality of traffic control systems are located in the radio coverage area of a base station.

FIG. 10 shows a schematic illustration of a message distribution system 12 for providing traffic messages to two traffic control systems, 15a and 15b, present in the radio coverage area 11 of the base station 10. The traffic control systems 15a and 15b are capable of controlling traffic infrastructures 16a, a traffic light, and 16b, an information panel. Table AI represents association information that is stored in storage module 17. As can be seen the radio coverage area 11 is associated with the routing addresses of traffic control systems 15a and 15b. The routing address of 15a is "A" and the routing address of 15b is "B". Further comprised in the association information is a geographic indication "Region" associated with traffic control systems 15a and 15b. Traffic control system 15a is associated with region "South" and traffic control system 15b is associated with region "North".

Figure 11:
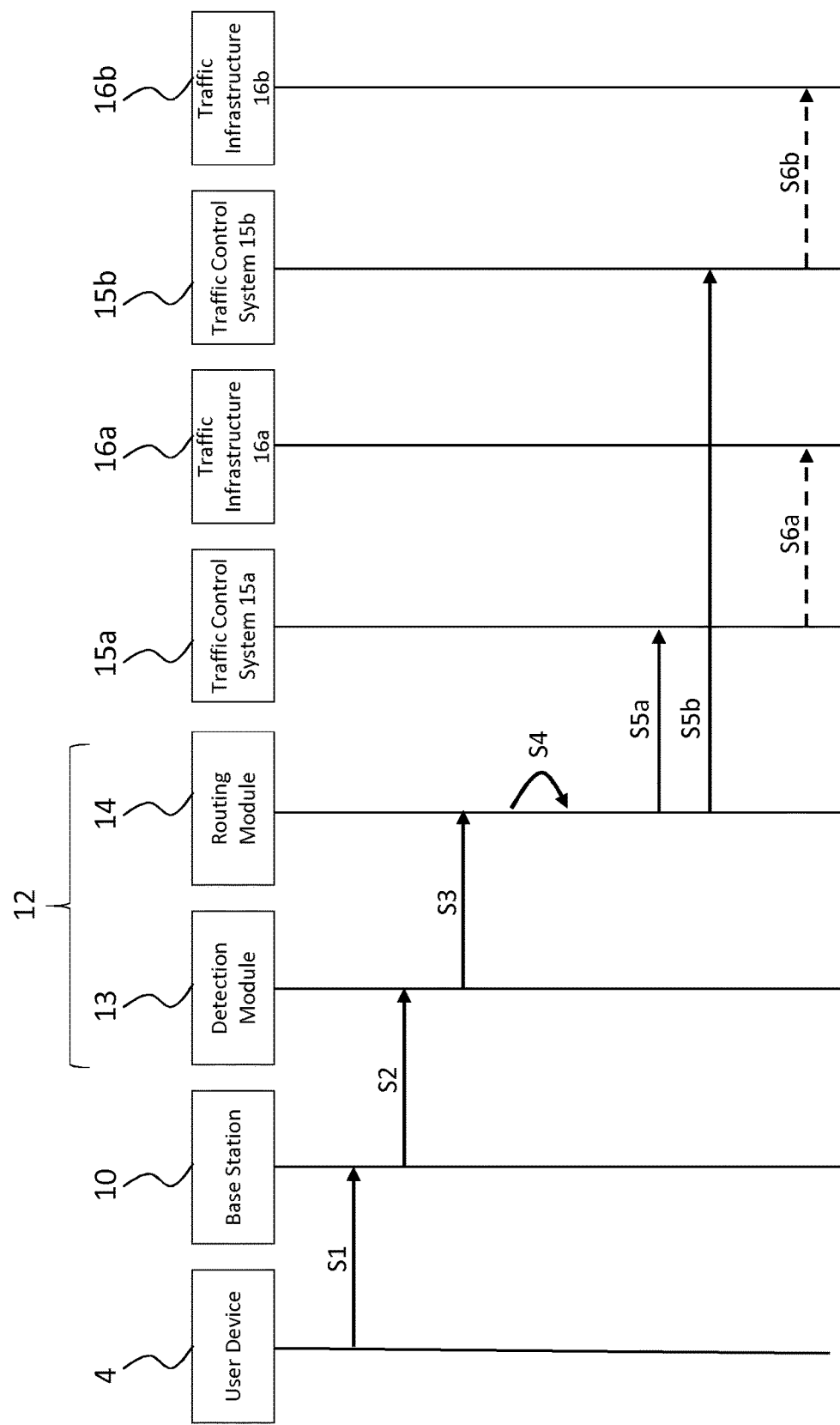
FIGS. 11 and 12 are timing diagrams illustrating examples of distributing traffic messages in the message distribution system of FIG. 10.

FIG. 11 depicts a time diagram of the traffic message distribution using the message distribution system of FIG. 10. Steps S1-S4 have been described above with reference to FIG. 3. In the embodiment of FIG. 11, the routing module 14 is configured to route copies of a received traffic massage to the routing addresses of all traffic control systems 15a, 15b in the radio coverage area 11. In step S5a a copy of the traffic message is routed to the routing address of the traffic control system 15a, while in step S5b another copy is routed to the routing address of traffic control system 15b. The traffic control system 15a may now control traffic infrastructure 16a, as shown in step S6a. And traffic control system 15b may now control traffic infrastructure 16b, as shown in step S6b.

Figure 12:
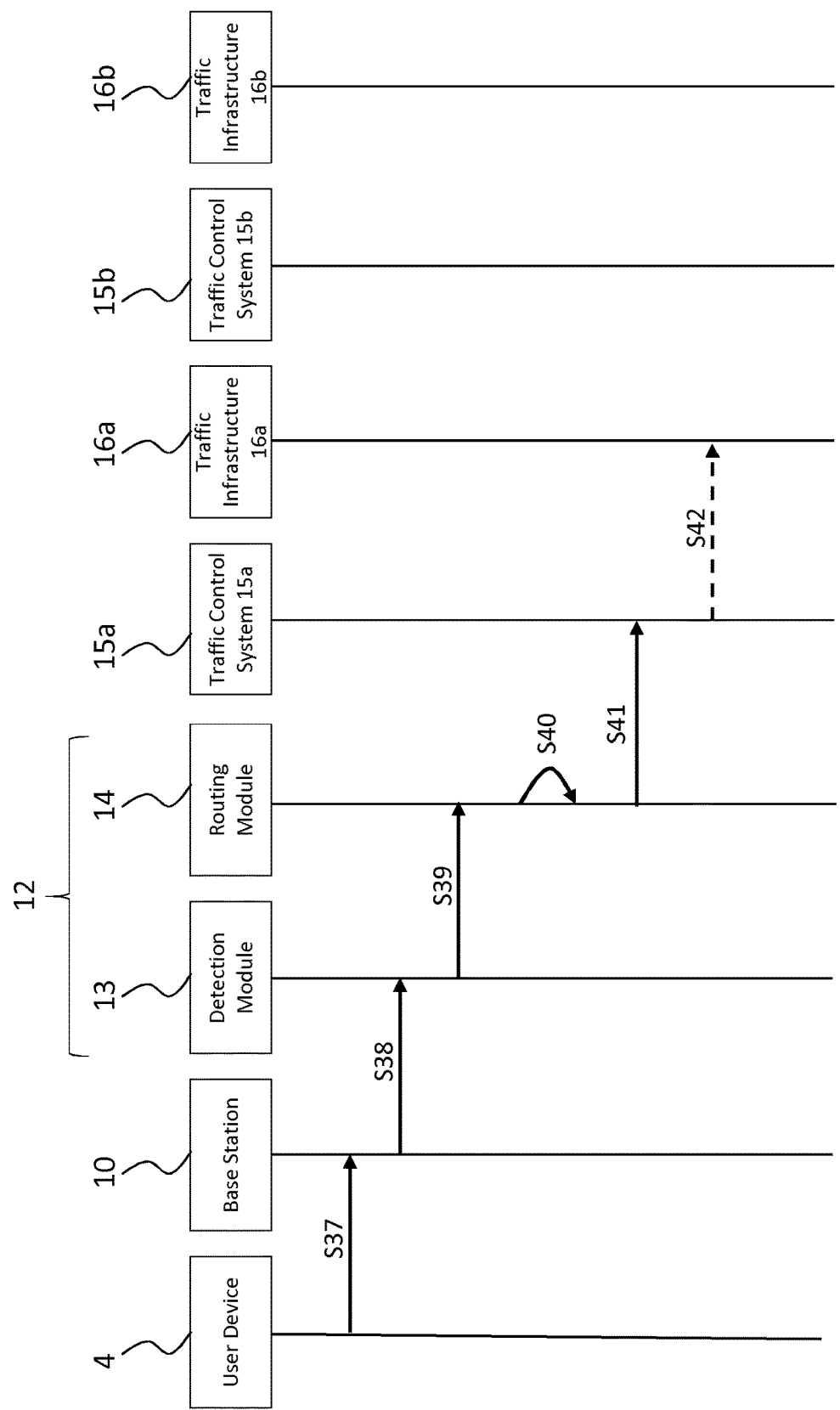

FIG. 12 shows a time diagram illustrating another embodiment of traffic message distribution in the message distribution system 12 as depicted in FIG. 10. In this embodiment the routing module 14 is configured to selectively route traffic messages on the basis of an indication in the traffic messages. The indication is an indication of the geographic location of the user device 4 within the radio coverage area 11, which in this case will be "South" as the user device 4 is present in region "South" as can be seen in FIG. 10. It should be noted that the indication "South" is for exemplary purposes and would e.g. comprise GPS coordinates from which the routing module 14 may derive "South". Referring to FIG. 12, step S37 represents the transmittal of a traffic message from user device 4 to base station 10, wherein the traffic message comprises the geographical indication "South" for selectively routing the traffic message. The traffic message is received at detection module 13 in step S38 and the detection module 13 detects (i.e. identifies) that the message is a traffic message. Step S39 represents the transmittal of the detected traffic message to the routing module 14. The routing module 14 processes the traffic message in step S40 by accessing the association information shown in table AI in FIG. 10 and retrieving a routing address. Based on the indication "South", the routing module retrieves the routing address "A" of traffic control system 15a only, and not a routing address of traffic control system 15b, because, as shown in table AI in FIG. 10, the indication "South" is associated with traffic control system 15a and not with traffic control system 15b. The traffic control system 15a may now control traffic infrastructure 16a as shown in step S42.

Figure 13:
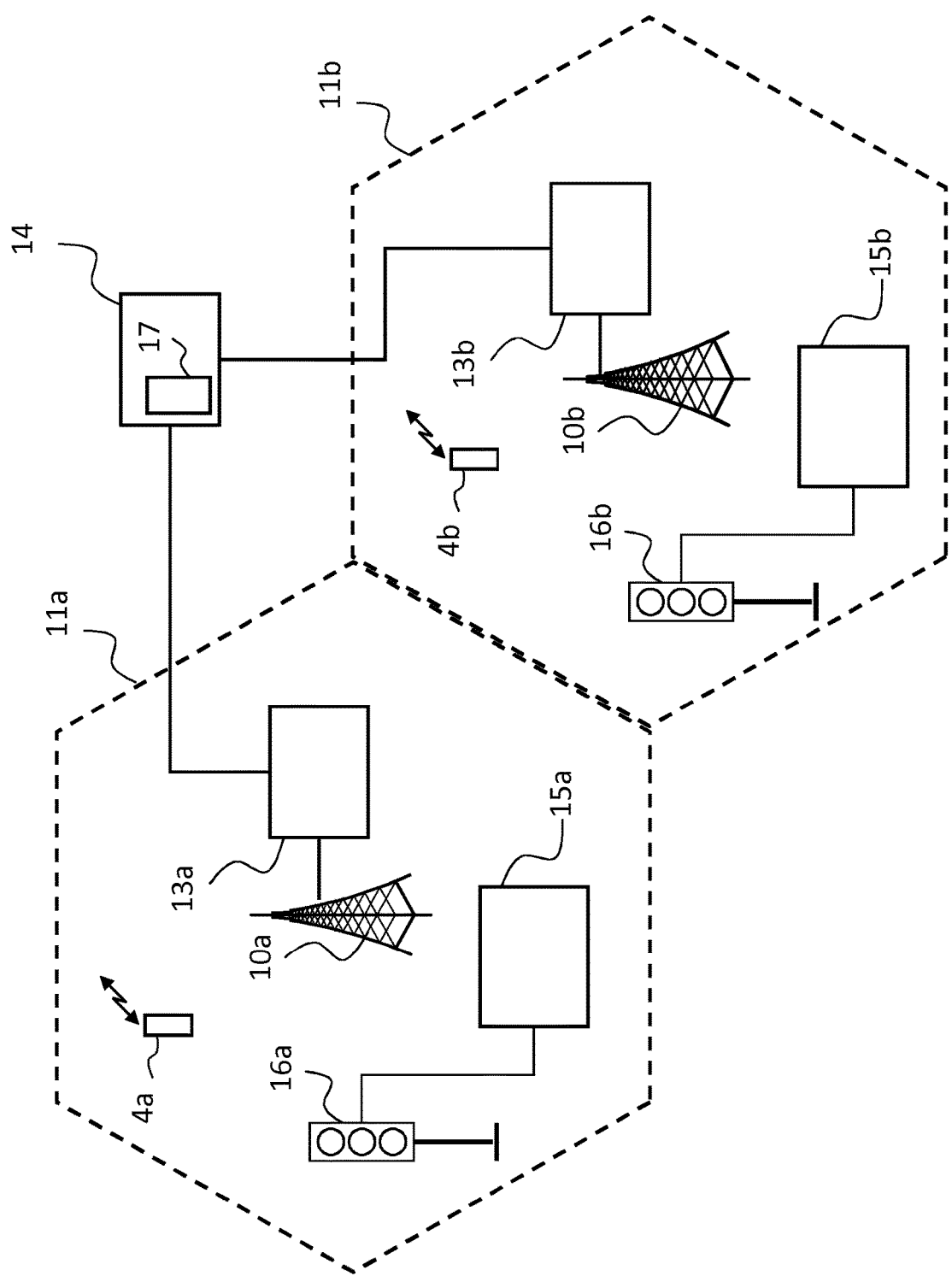
FIG. 13 is a schematic illustration of a message distribution system in an embodiment wherein a routing module is shared by two base stations.

FIG. 13 is a schematic depiction of a message distribution system 12 for a radio access network 2 comprising two base stations, 10a and 10b, and two corresponding radio coverage areas, 11a and 11b. In FIG. 13, the detection modules 13a and 13b are co-located respectively at the base stations 10a and 10b. The routing module 14 is shared by base stations 10a and 10b. The connection between the detection modules 13a and 13b on one side and the shared routing module 14 on the other side may be a wired or a wireless connection.

Figure 14:
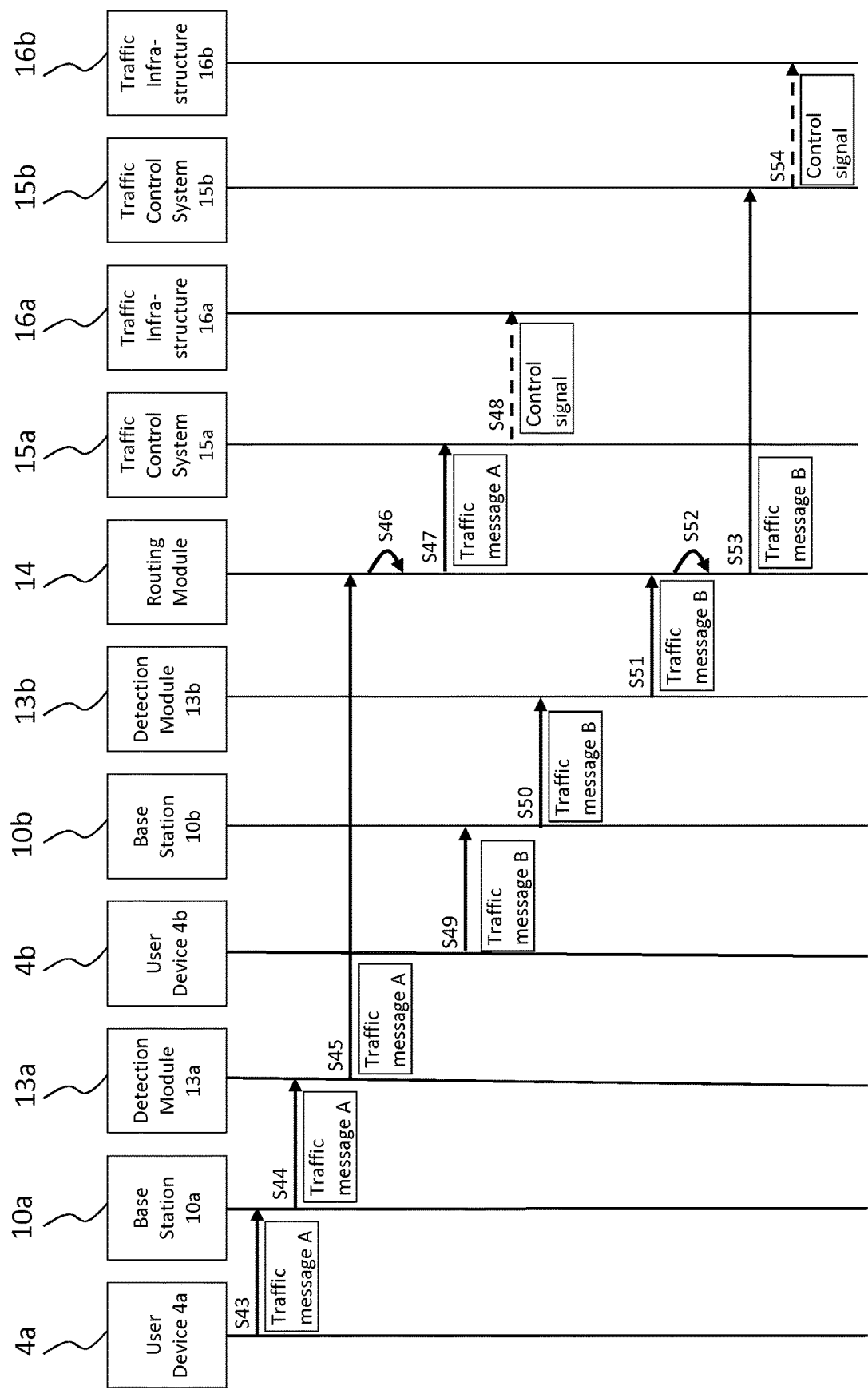
FIG. 14 is a time diagram illustrating an example of distributing traffic messages in the message distribution system of FIG. 13.

FIG. 14 shows a time diagram illustrating traffic message distribution in the message distribution system 12 of FIG. 13. In step S43, a traffic message A is received from user device 4a, which is present in radio coverage area 11a of base station 10a, at base station 10a. In step S44, the traffic message A is transmitted from the base station 10a to the detection module 13a, which is co-located with the base station 10a as can be seen in FIG. 13. Then, in step S45, the traffic message A is sent from the detection module 13a to the routing module 14, which is shared by base stations 10a and 10b. The routing module 14 processes traffic message A in step S46 by accessing association information and retrieving a routing address of traffic control system 15a. The routing module 14 routes in step S47 the traffic message A to the traffic control system 15a, after which the traffic control system in step S48 may send a control signal to the traffic infrastructure 16a.

A traffic message B is transmitted in step S49 from a user device 4B, which is present in the radio coverage 11b of base station 10b, to base station 10b. In step S50 the traffic message B is transmitted to the detection module 13b. Next, in step S51 the traffic message B transmitted to the shared routing module 14. Note that both traffic message A and traffic message B are transmitted to the routing module 14 in steps S45 and S51 respectively. The routing module 14 processes traffic message B in step S52 by retrieving a routing address of traffic control system 15b. In step S53 the traffic message B is routed to traffic control system 15b, after which the traffic control system 15b may control traffic infrastructure 16b as shown in step S54.

It should be noted that in this embodiment the routing module 14 is configured to selectively route the traffic messages. The traffic messages A and B are selectively routed to traffic control system 15a resp. traffic control system 15b. The indication based on which traffic messages are selectively routed may in this case be the indication at which base station 10a resp. 10b the traffic message was received. Note that traffic message A may be selectively routed to traffic control system 15a, because it was received at base station 10a. Traffic message B may be selectively routed to traffic control system 15b, because it was received at base station 10b. Additionally or alternatively, the indication may comprise geographic location information of the user device 4a resp. 4b that can be used for routing message A resp. message B to traffic control system 15a resp. 15b, similarly as described above in the embodiment of FIG. 10 and not repeated here.

Figure 15:
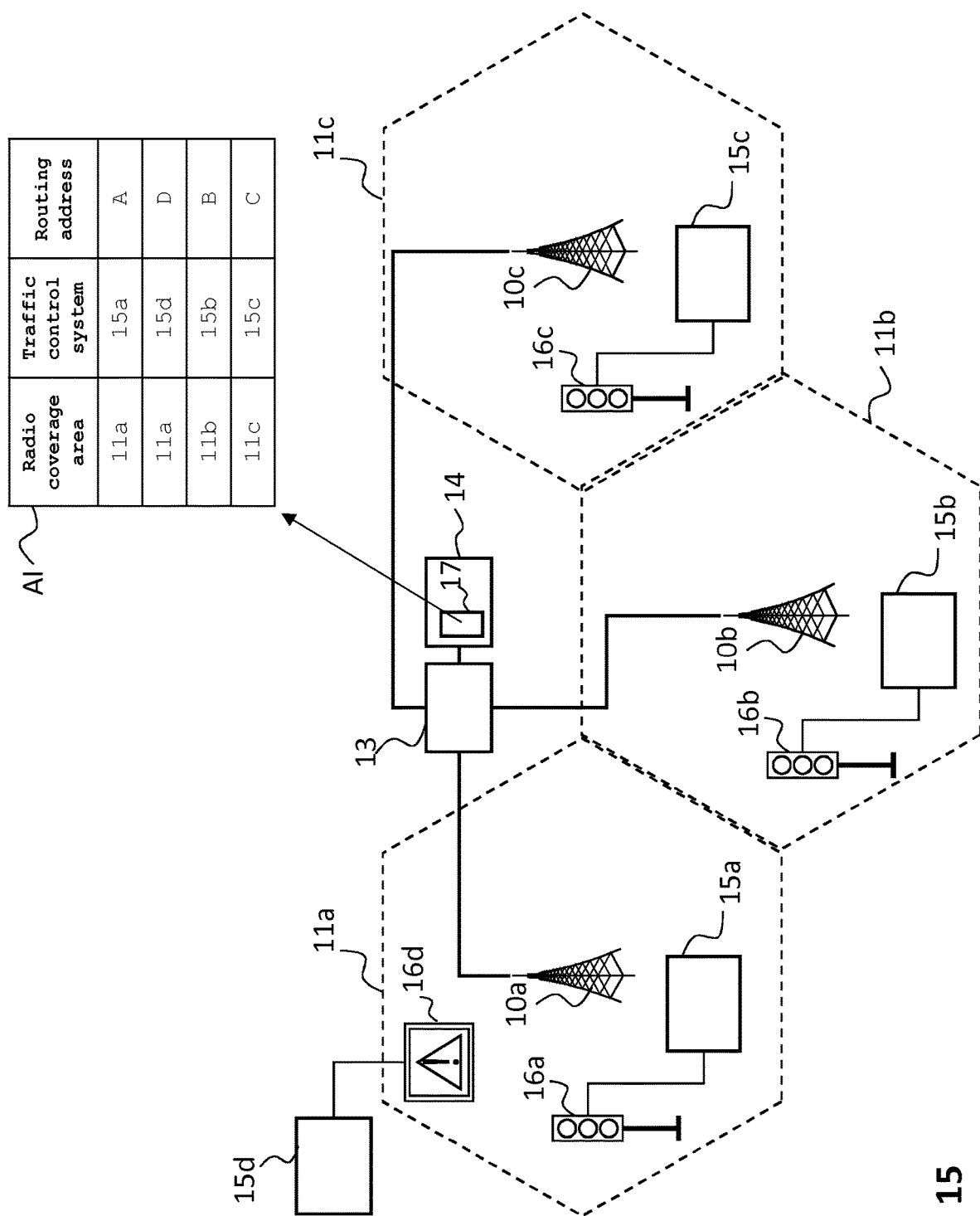
FIG. 15 is a schematic illustration of a message distribution system in an embodiment wherein a detection module and a routing module are shared by three base stations.

FIG. 15 shows another embodiment of a message distribution system 12 for a radio access network 2 comprising three base stations. In this embodiment both the detection module 13 and the routing module 14 are shared by the base stations 10a, 10b, and 10c. The routing module 14 comprises a storage module 17 storing association information. The association information stored in storage module 17 is shown in table AI in FIG. 15. As shown, the routing addresses of the traffic control systems 15a, and 15b are associated with the radio coverage areas 11a, the routing address of the traffic control system 15c is associated with radio coverage area 11b, and the routing address of the traffic control system 15d is associated with radio coverage area 11c.

Figure 16:
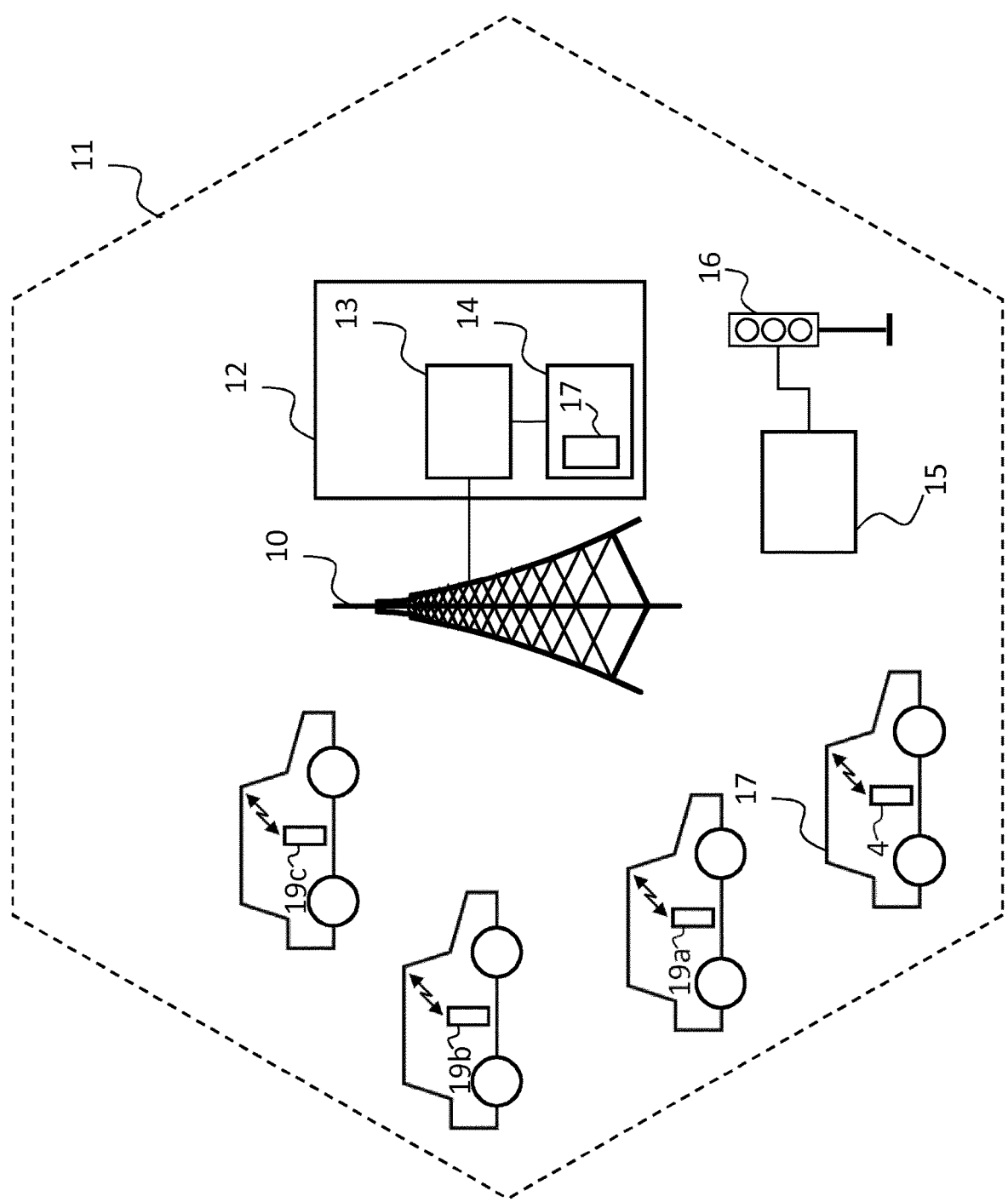
FIG. 16 is a schematic illustration of a user device for use with a message distribution system wherein Proximity Services Devices are present in the radio coverage area of the base station.

FIG. 16 is a schematic illustration of a user device 4 cooperating with a message distribution system 12 for a base station 10 providing a corresponding radio coverage area 11 as in FIG. 3. Further present in the radio coverage area 11 are proximity services devices, 19a, 19b and 19c, that are configured to receive traffic messages from the user device 4 that are broadcast with a ProSe broadcast.

Figure 17:
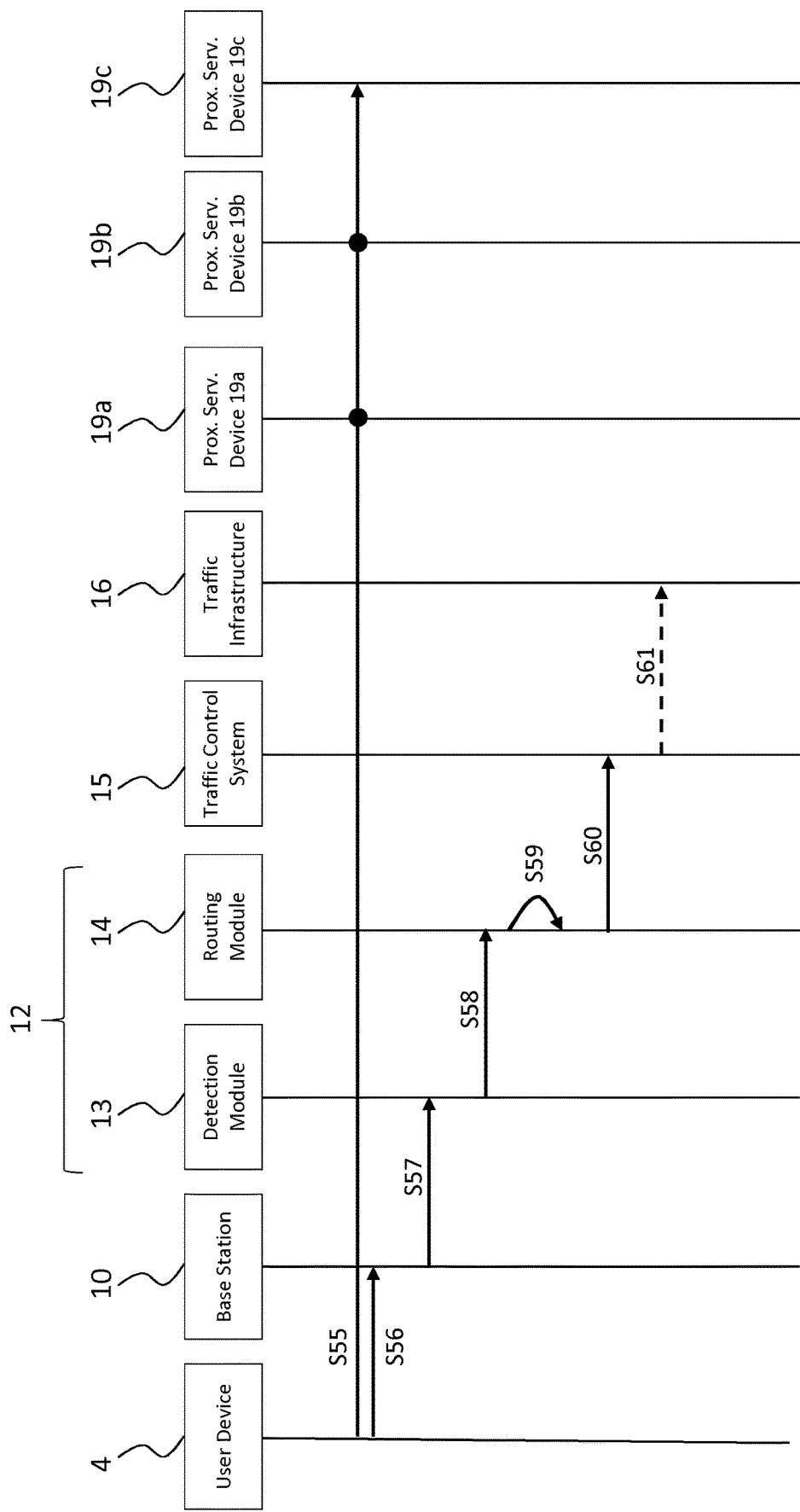
FIG. 17 is a time diagram illustrating an example of receiving a traffic message from a user device for the embodiment of FIG. 16.

FIG. 17 shows a time diagram of the traffic message transmission from user device 4. The user device 4 is configured to broadcast a traffic message, which is received at proximity services devices 19a, 19b and 19c in step S55. In step S56 the user device 4 unicasts the traffic message to base station 10, after which steps S57-S61 are performed which are similar to step S2-S6 as described with reference to FIG. 3. It should be noted that although two traffic messages are sent from the user device 4, a broadcast traffic message in step S55 and a unicast traffic message in step S56, the information that the messages convey comprises identical traffic information, for example the speed of a vehicle 17.

Figure 18:
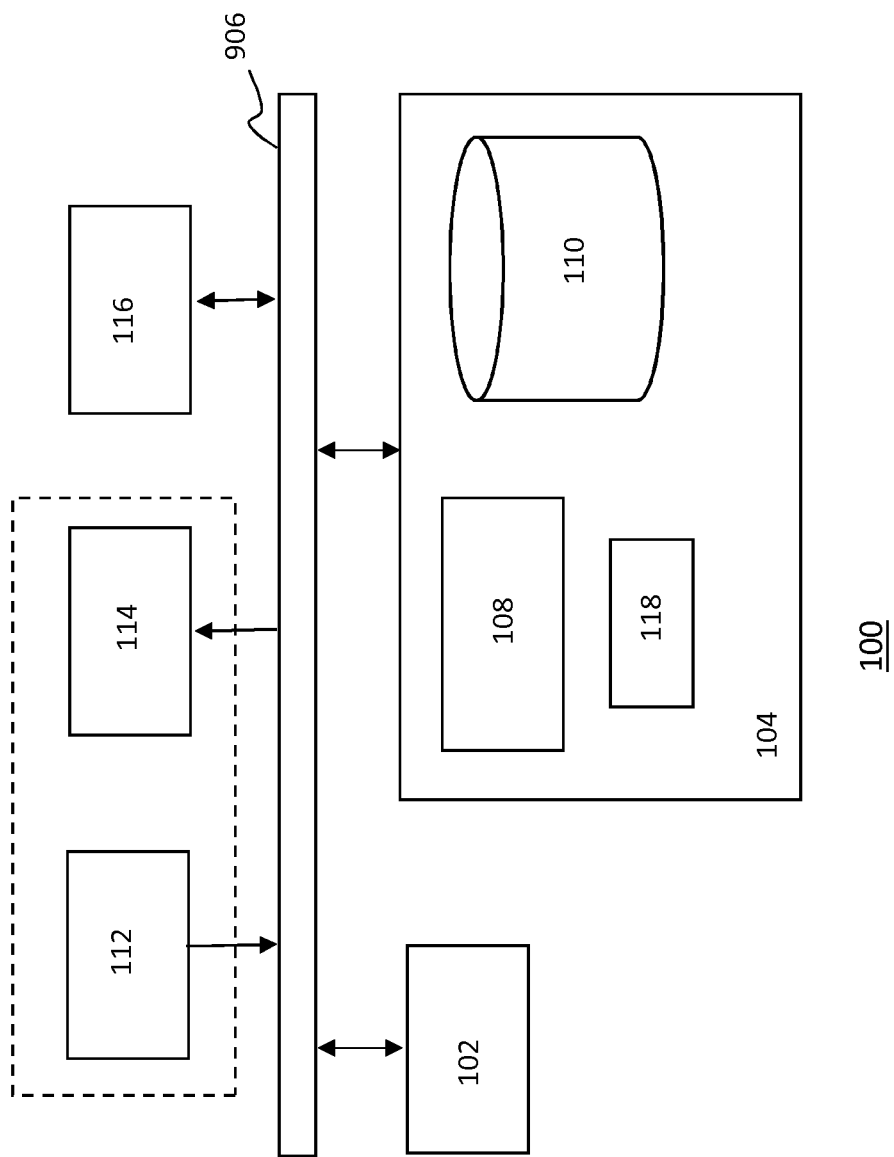
FIG. 18 depicts a block diagram illustrating an exemplary data processing system (e.g. a detection module, a routing module or a user device) that may be used in the message distribution system.

FIG. 18 depicts a block diagram illustrating an exemplary data processing system that may be used in the message distribution system 12 (e.g. the detection module 13 and/or the routing module 14) and/or the user device 4.

As shown in FIG. 18, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 18 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 18, the memory elements 104 may store an application 118. In various embodiments, the application 118 may be stored in the local memory 108, the one or more bulk storage devices 110, or apart from the local memory and the bulk storage devices. It should be appreciated that the data processing system 100 may further execute an operating system (not shown in FIG. 18) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

In one aspect of the present invention, the data processing system 100 may represent a detection module 13 or routing module 14 as described herein.

In another aspect, the data processing system 100 may represent a client data processing system, such as user device 4. In that case, the application 118 may represent a client application that, when executed, configures the data processing system 100 to perform the various functions described herein with reference to a "client". Examples of a client can include, but are not limited to, a personal computer, a portable computer, a mobile phone, or the like.

In yet another aspect, the data processing system 100 may represent a server. For example, the data processing system may represent an (HTTP) server, in which case the application 118, when executed, may configure the data processing system to perform (HTTP) server operations.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A message distribution system configured to provide traffic messages received by at least one base station of a telecommunications network to at least one traffic control system capable of controlling traffic infrastructure, the message distribution system comprising:
   a detection module having a first processor and first memory storing instructions that when executed by the processor cause the detection module to detect traffic messages from user devices in a radio coverage area of the at least one base station, and to distinguish between traffic messages and non-traffic messages received from the user devices; and
   a routing module having a second processor and second memory storing instructions that, when executed by the processor, cause the routing module to access association information associating at least one routing address of the at least one traffic control system with the radio coverage area of the at least one base station, and to route the detected traffic messages from the user devices to the at least one routing address associated with the radio coverage area of the at least one base station receiving the traffic messages from the user devices.

2. The message distribution system according to claim 1, wherein the at least one traffic control system is located in the radio coverage area.

3. The message distribution system according to claim 1, wherein the at least one traffic control system is located outside of the radio coverage area.

4. The message distribution system according to claim 1, wherein the message distribution system is further configured to wirelessly receive configuration messages from the at least one traffic control system via the at least one base station and to determine the association information from the configuration messages.

5. The message distribution system according to claim 1, wherein the message distribution system is further configured to receive update messages from the at least one traffic control system.

6. The message distribution system according claim 1, wherein the detection module is caused to distinguish traffic messages from non-traffic messages received from the user devices by at least one of:
   detecting broadcast messages from the user devices at the at least one base station, wherein the broadcast messages comprise the traffic messages;
   detecting signaling messages from the user devices at the at least one base station, wherein the signaling messages comprise the traffic messages;
   detecting the traffic messages by deep packet inspection; or
   detecting the traffic messages over a PDP context or EPS bearer associated with a specific APN.

7. The message distribution system according to claim 1, wherein the radio coverage area comprises a plurality of traffic control systems and wherein the routing module is configured for at least one of:
   routing copies of a received traffic message to routing addresses of the plurality of traffic control systems associated with the radio coverage area of the at least one base station in response to detecting the traffic message; or
   selectively routing one or more copies of a received traffic message to one or more routing addresses of one or more traffic control systems of the plurality of traffic control systems on the basis of an indication, in the traffic messages in response to detecting the traffic message.

8. The message distribution system according to claim 1, wherein at least one of the detection module or the routing module is shared by a plurality of base stations.

9. The message distribution system according to claim 1, wherein both the detection module and the routing module are co-located at at least one base station.

10. The message distribution system according to claim 1, wherein the first processor and the second processor are the same processor, and/or the first memory and the second memory are the same memory.

11. A detection module disposed within a message distribution system configured to provide traffic messages received by at least one base station of a telecommunications network to at least one traffic control system capable of controlling traffic infrastructure, the detection module comprising:
   one or more processors;
   memory; and
   instructions stored in the memory that, when executed by the one or more processors, cause the detection module to carry out operations including:
     detecting traffic messages from user devices in a radio coverage area of at least one base station;
     distinguishing traffic messages from non-traffic messages received from the user devices; and
     forwarding the traffic messages to a routing module disposed within the message distribution system.

12. A routing module disposed within a message distribution system configured to provide traffic messages received by at least one base station of a telecommunications network to at least one traffic control system capable of controlling traffic infrastructure, the routing module comprising:
   one or more processors;
   memory; and
   instructions stored in the memory that, when executed by the one or more processors, cause the routing module to carry out operations including:
     receiving detected traffic messages from a detection module within the message distribution system, the traffic messages having been distinguished from non-traffic messages received from user devices;
     accessing association information associating a first routing address of a first traffic control system with a first base station, and associating a second routing address of a second traffic control system with a second base station; and
     routing the detected traffic messages to the routing address associated with the base station receiving the detected traffic messages from the user devices.

13. A method for providing traffic messages received by at least one base station of a telecommunications network to at least one traffic control system capable of controlling traffic infrastructure, the method comprising:

detecting traffic messages from user devices in a radio coverage area of the at least one base station;

distinguishing between traffic messages and non-traffic messages received from the user devices; and accessing association information associating at least one routing address of the at least one traffic control system with the radio coverage area of the at least one base station and routing the detected traffic messages to the at least one routing address associated with the radio coverage area of the at least one base station receiving the traffic messages from the user devices.

14. The method according to claim 13, further comprising:

wirelessly receiving configuration messages from the at least one traffic control system via the at least one base station; and determining the association information from the configuration messages.

15. The method according to claim 13, further comprising:

receiving update messages from the at least one traffic control system.

16. The method according to claim 13, wherein distinguishing traffic messages from non-traffic messages received from the user devices comprises detecting broadcast messages from the user devices at the at least one base station, wherein the broadcast messages comprise the traffic messages.

17. The method according to claim 13, wherein distinguishing traffic messages from non-traffic messages received from the user devices comprises detecting signaling messages from the user devices at the at least one base station, wherein the signaling messages comprise the traffic messages.

18. The method according to claim 13, wherein distinguishing traffic messages from non-traffic messages received from the user devices comprises detecting the traffic messages by deep packet inspection.

19. The method according to claim 13, wherein distinguishing traffic messages from non-traffic messages received from the user devices comprises detecting the traffic messages over a PDP context or EPS bearer associated with a specific APN.

20. The method according to claim 13, wherein the radio coverage area comprises a plurality of traffic control systems, and wherein the method further comprises:

routing copies of a received traffic message to routing addresses of the plurality of traffic control systems associated with the radio coverage area of the at least one base station in response to detecting the traffic message.

21. The method according to claim 13, wherein the radio coverage area comprises a plurality of traffic control systems, and wherein the method further comprises:

selectively routing one or more copies of a received traffic message to one or more routing addresses of one or more traffic control systems of the plurality of traffic control systems on the basis of an indication, in the traffic messages in response to detecting the traffic message.

22. A non-transitory computer-readable medium have instructions stored thereon that, when executed by one or more processors of a message distribution system configured to provide traffic messages received by at least one base station of a telecommunications network to at least one traffic control system capable of controlling traffic infrastructure, cause the message distribution system to carry out operations including:

detecting traffic messages from user devices in a radio coverage area of the at least one base station;

distinguishing between traffic messages and non-traffic messages received from the user devices; and accessing association information associating at least one routing address of the at least one traffic control system with the radio coverage area of the at least one base station and routing the detected traffic messages to the at least one routing address associated with the radio coverage area of the at least one base station receiving the traffic messages from the user devices.

* * * * *